(12) United States Patent
Peters et al.

(10) Patent No.: US 7,487,309 B2
(45) Date of Patent: *Feb. 3, 2009

(54) COMPUTER SYSTEM AND PROCESS FOR TRANSFERRING MULTIPLE HIGH BANDWIDTH STREAMS OF DATA BETWEEN MULTIPLE STORAGE UNITS AND MULTIPLE APPLICATIONS IN A SCALABLE AND RELIABLE MANNER

(75) Inventors: Eric C. Peters, Carlisle, MA (US); Stanley Rabinowitz, Westford, MA (US); Herbert R. Jacobs, Hudson, NH (US); Peter J. Fasciano, Natick, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/522,758

(22) Filed: Sep. 18, 2006

(65) Prior Publication Data

US 2007/0016727 A1    Jan. 18, 2007

Related U.S. Application Data

(63) Continuation of application No. 10/883,387, filed on Jul. 1, 2004, now Pat. No. 7,111,115, which is a continuation of application No. 10/186,929, filed on Jul. 1, 2002, now Pat. No. 6,760,808, which is a continuation of application No. 09/006,070, filed on Jan. 12, 1998, now Pat. No. 6,415,373, which is a continuation of application No. 08/997,769, filed on Dec. 24, 1997, now abandoned.

(51) Int. Cl.
G06F 12/00 (2006.01)

(52) U.S. Cl. ............................. 711/162; 711/112; 714/6; 714/7

(58) Field of Classification Search .................. 711/112, 711/114, 111, 162, 165, 161; 714/6, 5, 7
See application file for complete search history.

(56) References Cited

U.S. PATENT DOCUMENTS 4,887,204 A    12/1989    Johnson et al.

(Continued)

FOREIGN PATENT DOCUMENTS

EP    0657801    6/1995

(Continued)

OTHER PUBLICATIONS

U.S. Appl. No. 08/997,769, filed Dec. 24, 1997, Peters et al.
"Striping in a RAID Level 5 Disk Array", Peter Cheng et al., ACM Computing Surveys, 1995, pp. 136-145.

(Continued)

*Primary Examiner*—Pierre-Michel Bataille
(74) *Attorney, Agent, or Firm*—Peter J. Gordon; Fish & Richardson; Oliver Strimpel

(57) ABSTRACT

Multiple applications request data from multiple storage units over a computer network. The data is divided into segments and each segment is distributed randomly on one of several storage units, independent of the storage units on which other segments of the media data are stored. At least one additional copy of each segment also is distributed randomly over the storage units, such that each segment is stored on at least two storage units. This random distribution of multiple copies of segments of data improves both scalability and reliability. When an application requests a selected segment of data, the request is processed by the storage unit with the shortest queue of requests. Random fluctuations in the load applied by multiple applications on multiple storage units are balanced nearly equally over all of the storage units. This combination of techniques results in a system which can transfer multiple, independent high-bandwidth streams of data in a scalable manner in both directions between multiple applications and multiple storage units.

39 Claims, 20 Drawing Sheets

U.S. PATENT DOCUMENTS

| | | | |
|---|---|---|---|
| 5,210,866 A * | 5/1993 | Milligan et al. ............... 714/6 |
| 5,262,875 A | 11/1993 | Mincer et al. |
| 5,333,299 A | 7/1994 | Koval et al. |
| 5,371,852 A | 12/1994 | Attanasio et al. |
| 5,371,882 A | 12/1994 | Ludlam |
| 5,394,526 A | 2/1995 | Crouse et al. |
| 5,420,984 A | 5/1995 | Good et al. |
| 5,423,037 A | 6/1995 | Hvasshovd |
| 5,434,994 A | 7/1995 | Shaheen et al. |
| 5,442,749 A | 8/1995 | Northcutt et al. |
| 5,463,765 A | 10/1995 | Kakuta et al. |
| 5,469,453 A * | 11/1995 | Glider et al. ............... 714/6 |
| 5,473,362 A | 12/1995 | Fitzgerald et al. |
| 5,485,474 A | 1/1996 | Rabin |
| 5,508,732 A | 4/1996 | Bottomley et al. |
| 5,510,905 A | 4/1996 | Birk |
| 5,511,177 A * | 4/1996 | Kagimasa et al. ........... 711/114 |
| 5,517,652 A | 5/1996 | Miyamoto et al. |
| 5,521,630 A | 5/1996 | Chen et al. |
| 5,526,132 A | 6/1996 | Tsubota et al. |
| 5,537,408 A | 7/1996 | Branstad et al. |
| 5,537,533 A | 7/1996 | Staheli et al. |
| 5,537,567 A * | 7/1996 | Galbraith et al. ............... 714/6 |
| 5,542,087 A | 7/1996 | Neimat et al. |
| 5,544,327 A | 8/1996 | Dan et al. |
| 5,544,347 A | 8/1996 | Yanai et al. |
| 5,546,118 A | 8/1996 | Ido |
| 5,550,577 A | 8/1996 | Verbiest et al. |
| 5,550,982 A | 8/1996 | Long et al. |
| 5,553,005 A | 9/1996 | Voeten et al. |
| 5,555,244 A | 9/1996 | Gupta et al. |
| 5,555,404 A | 9/1996 | Torbjørnsen et al. |
| 5,559,549 A | 9/1996 | Hendricks et al. |
| 5,559,641 A | 9/1996 | Kajimoto et al. |
| 5,559,764 A | 9/1996 | Chen et al. |
| 5,559,808 A | 9/1996 | Kostreski et al. |
| 5,559,984 A | 9/1996 | Nakano et al. |
| 5,566,297 A | 10/1996 | Devarakonda et al. |
| 5,574,845 A | 11/1996 | Benson et al. |
| 5,581,784 A | 12/1996 | Tobagi et al. |
| 5,583,561 A | 12/1996 | Baker et al. |
| 5,583,868 A | 12/1996 | Rashid et al. |
| 5,585,852 A | 12/1996 | Agarwal |
| 5,586,264 A | 12/1996 | Belknap et al. |
| 5,592,612 A | 1/1997 | Birk |
| 5,592,626 A | 1/1997 | Papadimitriou et al. |
| 5,594,924 A | 1/1997 | Ottesen et al. |
| 5,610,841 A | 3/1997 | Tanaka et al. |
| 5,623,690 A | 4/1997 | Palmer et al. |
| 5,642,171 A | 6/1997 | Baumgartner et al. |
| 5,644,720 A | 7/1997 | Boll et al. |
| 5,647,047 A | 7/1997 | Nagasawa |
| 5,684,963 A | 11/1997 | Clement |
| 5,692,128 A | 11/1997 | Bolles et al. |
| 5,694,334 A | 12/1997 | Donahue et al. |
| 5,712,976 A | 1/1998 | Falcon, Jr. et al. |
| 5,732,239 A | 3/1998 | Tobagi et al. |
| 5,734,925 A | 3/1998 | Tobagi et al. |
| 5,737,595 A | 4/1998 | Cohen et al. |
| 5,737,747 A | 4/1998 | Vishlitzky et al. |
| 5,754,882 A | 5/1998 | Tobagi et al. |
| 5,757,415 A | 5/1998 | Asamizuya et al. |
| 5,768,681 A | 6/1998 | Dan et al. |
| 5,790,773 A * | 8/1998 | DeKoning et al. .......... 711/114 |
| 5,799,174 A | 8/1998 | Muntz et al. |
| 5,829,046 A | 10/1998 | Tzelnic et al. |
| 5,862,312 A | 1/1999 | Mann et al. |
| 5,893,086 A | 4/1999 | Schmuck et al. |
| 5,915,094 A | 6/1999 | Kouloheris et al. |
| 5,920,702 A | 7/1999 | Bleidt et al. |
| 5,926,649 A | 7/1999 | Ma et al. |
| 5,933,603 A | 8/1999 | Vahalia et al. |
| 5,940,838 A | 8/1999 | Schmuck et al. |
| 5,940,841 A | 8/1999 | Schmuck et al. |
| 5,946,686 A | 8/1999 | Schmuck et al. |
| 5,949,948 A | 9/1999 | Krause et al. |
| 5,950,015 A | 9/1999 | Korst et al. |
| 5,950,199 A | 9/1999 | Schmuck et al. |
| 5,956,734 A | 9/1999 | Schmuck et al. |
| 5,959,860 A | 9/1999 | Styczinski |
| 5,960,446 A | 9/1999 | Schmuck et al. |
| 5,963,963 A | 10/1999 | Schmuck et al. |
| 5,974,424 A | 10/1999 | Schmuck et al. |
| 5,987,477 A | 11/1999 | Schmuck et al. |
| 5,996,089 A | 11/1999 | Mann et al. |
| 5,999,976 A | 12/1999 | Schmuck et al. |
| 6,016,166 A | 1/2000 | Huang et al. |
| 6,018,765 A | 1/2000 | Durana et al. |
| 6,021,408 A | 2/2000 | Ledain et al. |
| 6,021,508 A | 2/2000 | Schmuck et al. |
| 6,023,706 A | 2/2000 | Schmuck et al. |
| 6,032,216 A | 2/2000 | Schmuck et al. |
| 6,047,309 A | 4/2000 | Dan et al. |
| 6,061,732 A | 5/2000 | Korst et al. |
| 6,070,191 A | 5/2000 | Narendran et al. |
| 6,112,223 A | 8/2000 | Chadwick et al. |
| 6,134,596 A | 10/2000 | Bolosky et al. |
| 6,138,221 A | 10/2000 | Korst et al. |
| 6,160,547 A | 12/2000 | Roth |
| 6,185,621 B1 | 2/2001 | Romine |
| 6,282,155 B1 | 8/2001 | Takahashi et al. |
| 6,374,336 B1 | 4/2002 | Peters et al. |
| 6,415,373 B1 | 7/2002 | Peters et al. |
| 6,449,688 B1 | 9/2002 | Peters et al. |
| 6,745,286 B2 | 6/2004 | Priester et al. |
| 6,760,808 B2 | 7/2004 | Peters et al. |
| 6,785,768 B2 | 8/2004 | Peters et al. |
| 6,828,670 B2 | 12/2004 | Hayama et al. |
| 7,111,115 B2 | 9/2006 | Peters et al. |

FOREIGN PATENT DOCUMENTS

| | | |
|---|---|---|
| EP | 0674414 | 9/1995 |
| EP | 0701198 | 3/1996 |
| EP | 0740247 | 10/1996 |
| EP | 0767585 | 4/1997 |
| EP | 780765 | 6/1997 |
| GB | 2 299 424 | 10/1996 |
| GB | 2 312 316 | 10/1997 |
| GB | 2 312 317 | 10/1997 |
| GB | 2 312 318 | 10/1997 |
| GB | 2 312 319 | 10/1997 |
| WO | WO 98/10586 | 3/1998 |

OTHER PUBLICATIONS

"RAID: High Performance, Reliable Secondary Storage", (Peter Chen et al, ACM Computing Surveys, vol. 26, No. 2, pp. 145-185, Jun. 1994.

The RAID Book, Massiglia.

Efficiently Distributing Data in a Web Server Farm by Randal C. Burns, Robert M. Rees and Darrell D. E. Long, pp. 1-11.

"IBM Storage Tank, A Distributed Storage System" Pease et al., IBM Almaden Research Center; R.C. Burns: John Hopkins University; D.D.E. Long: University of California, Santa Cruz, Jan. 23, 2002, pp. 1-7.

Adam, Joel F., et al., "A Network Architecture for Distributed Multimedia Systems", Proc. IEEE Intl. Conf. Multimedia, 1994, pp. 76-85.

Alemany, Juan, et al., "Random Striping for News on Demand Servers," Dept. of Computer Science & Engineering, University of Washington, Feb. 1997,pp. 1-15.

Anderson, David P., "Real-time Disk Storage and Retrieval of Digital Audio/Video Data," Computer Science Div., University of California at Berkeley, Aug. 8, 1991, pp. 1-26.

Anderson, David P., "Meta-Scheduling for Distributed Continuous Media," Computer Science Division, University of California at Berkeley, Oct. 4, 1990, pp. 1-32.

Asami, Satoshi, et al., "The Design of Large-Scale, Do-It-Yourself RAIDs," Nov. 10, 1995, pp. 1-30.

Baker, Mary, et al, "Availability in the Sprite Distributed File System", in Operating Systems Review, Apr. 1991, 4 pages.

Bartal, Yair, et al., "The Distributed A-Server Problem—A Competitive Distributed Translator For A-Server Algorithms", 1992 IEEE, pp. 344-353.

Berson, Steven, et al, "Randomized Data Allocation for Real-time Disk I/O", Compeon 96, pp. 286-290, 1996.

Bestavros, Azer,"An Adaptive Information Dispersal Algorithm for Time-Critical Reliable Communication", In Network Mgint. and Control. vol. II, pp. 423-438, Plenum Pub., 1994.

Birk, Yitzhak, "Deterministic Load-Balancing Schemes for Disk-Based Video-On-Demand Storage Servers", Israel Institute of Technology, 1995 IEEE, pp. 17-25.

Birk, Yitzhak, "Random RAIDs with Selective Exploitation of Redundancy for Higher Performance Video Servers", EE Department Israel Institute of Technology, 1997 IEEE, pp. 13-23.

Bohossian, Vasken, et al., "Computing in the RAIN: A Reliable Array of Independent Nodes," California Institute of Technology, Dec. 3, 1998, pp. 1-19.

Bolosky, William J., et al., "The Tiger Video Fileserver," Technical Report, Sixth International Workshop on Network and Operating System Support for Digital Audio and Video, Apr. 1996.

Brinkman, Andre, et al., "Hierarchical Storage Management in a Distributed VOD System", University of California at Berkeley, IEEE Multimedia, Fall 1996, pp. 37-47.

Brubeck, David W., et al., "Hierarchical Storage Management in a Distributed VOD System", University of California at Berkeley, IEEE Multimedia, Fall 1996, pp. 37-47.

Buddhikot, Miling M., et al., "Design of a Large Scale Multimedia Storage Server", Computer Networks and ISDN Systems 27, 1994, pp. 503-517.

Cabrera, Luis-Fellpe, et al, "Swift: Using Distributed Disk Stripping to Provide High I/O Data Rates", Computing Systems 4, Fall 1991, pp. 405-435.

Chen, Peter M., et al., "RAID: High Performance, Reliable Secondary Storage", ACM Computing Surveys, vol. 26, No. 2, Jun. 1994, pp. 146-185.

Devarakonda, Murthy, et al, "Recovery in the Calypso File System", ACM Transactions on Computer Systems, vo. 14, No. 3, Aug. 1996, pp. 287-310.

Gifford, David K., et al., "The Cedar File System," Communications of the ACM, vol. 31, No. 3, Mar. 1998, pp. 288-298.

Tho Computer Science and Engineering Handbook; A CRC Handbook, 1997, pp. 1851-1869.

Copeland, George, et al., "Data Placement in Bubba", ACM, 1988, pp. 99-108.

Coyne, Robert A., et al., "Storage Systems for National Information Assest", Lawrence Livermore National Laboratory, IEEE, 1992, pp. 626-633.

Dan, Asit, et al., "Buffering and Caching in Large-Scale Video Servers", IBM Research Division, Compcon, 1995.

Dannengberg, Roger B., et al., "A Comparison of Streams and Time Advance As Paradigms For Multimedia Systems," Carneigie Mellon Information Technology Center, Mar. 1994, pp. i-18.

Dias, Daniel M., et al., "A Scalable and Highly Available Web Server", IBM Research Division, Proc. IEEE, Compcon 1996, pp. 85-92.

Dibble, Petter C. et al., "Bridge: A High-Performance File System for Parallel Process", Proc. 8.sup.th Intl. Conf. Dist. Comp. Sys. Jun. 1988, pp. 154-161.

Drapeau, Ann L., et al., "Striped Tape Arrays", Twelfth IEEE Symposium on Mass Storage Systems, 1993, pp. 257-265.

Einozahy, E.N., "Storage Strategies for Fault-Tolerant Video Servers," Carnegic Mellon University, Aug. 1996, pp. 1-11.

Encyclopedia of Computer Science, Third Edition, 1993 "Distributed Systems," pp. 476-555 "Network Architecture," pp. 920-929 "Operating Systems," pp. 966-989.

Escobar-Molano, Martha L., "An Optimal Resource Scheduler for Continuous Display of Structured VIdeo Objects," IEEE Transactions on Knowledge and Data Engineering, vol. 8, No. 3, Jun. 1996, pp. 508-511.

Federighi, Craig et al., "A Distributed Hierarchical Storage Manager for a Video-on-Demand System", ISAT/SPIE, Feb. 1994, pp. 1-13.

Feuquay, Jay, "A Distributed Parallel Storage Architecture and its Potential Application Within EOSDIS", In Proc. 4.sup.th NASA GSFC Mass Storage, Mar. 1995.

Flynn, Robert, et al., "Disk Striping and Block Replication Algorithms for Video File Servers", XP-002105211, IEEE Proceedings of Multimedia 1996, pp. 590-597.

Ganger, Gregory R., et al., "Disk Subsystem Load Balancing: Disk Striping vs. Conventional Data Placement", IEEE 1993, pp. 40-49.

Ghandeharizadeh, Shahram, et al., "Continuous Retrieval of Multimedia Data Using Parallelism," IEEE Transactions on Knowledge and Data Engineering, vol. 3, No. 4, Aug. 1993, pp. 658-669.

Gibson, Garth A., et al., "A Case for Network-Attached Secure Disks", Carnegie Mellon University, SMU-CS-96-142, Sep. 26, 1996.

Gollapudi, Srecivas, et al., "Net Media: A Cleint-Server Distributed Multimedia Database Environment," University at Buffalo, Dept. of Computer Science, Technical Report 96-06, Apr. 1996, pp. 1-17.

Haskin, Roger L., et al, "The Tiger Shark File System", Proc. IEEE Computer Conference, Mar. 1996, pp. 226-231.

Haskin, Roger L., "Tiger Shark—a scalable file system for multimedia", in IBM Journal of Research and Development, vol. 42, No. 2, Mar. 1998, pp. 185-197.

Hartman, John H., et al., "The Zebra Striped Network File System," ACM Transactions on Computer vol. 13, No. 3, Aug. 1995, pp. 274-310.

Hsieh, Jenwei, et al., "Performance of a Mass Storage System for Video-on-Demand," Journal of Parallel and Distributed Computing, vol. 30, 1995, pp. 147-167.

Keeton, Kimberly, "The Evaluation of Video Layout Strategies for a High-Performance Storage Server," Computer Science Division, University of California, Berkeley, Nov. 1995, pp. 1-27.

Krishnamurthy, A., et al., "Connection-Oriented Service Renegotiation for Scalable Video Delivery," May 1994, In Proc. of 1.sup.stIEEE Intl. Conf. on Multimedia Computer and Systems (ICMCS '94), pp. 502-507.

Ladin, Rivka, et al., Providing High Availability Using Lazy Replication, ACM Transactions on Computer Systems, vol. 10, No. 4, Nov. 1992, pp. 360-391.

Lee, Edward K., et al, "Petal: Distributed Virtual Disks", in The Proceedings of 7.sup.th Intl. Conf. on Architectural Support for Programming Languages and Operating Systems, 1996, 9 pages.

Li, Qing, et al., "A Dynamic Data Model for a Video Database Management System," ACM Computing Surveys, vol. 27, No. 4, Dec. 1995, pp. 602-606.

Lin, Ying-Dar, "A Hierarchical Network Storage Architecture for Video-on-Demand Services", atopma; Chiao Tung University, IEEE 1996, pp. 355-364.

Liskov, Barbara, "Replication in the Harp File System," ACM 1991, pp. 226-238.

Liule, T,D.C., et al., "Probabilistic Assignment of Movies to Storage Devices in a Video-on-Demand System", In Proc. 4.sup.th Intl. Workshop of Network and OS for Digital Audio and Video, Nov. 1992, pp. 213-224.

Liu, Jonathan Chien-Liang, "Performance of a Storage System for Supporting Different Video Types and Qualities," IEEE Journal On Selected Areas In Communications, vol. 14, No. 7, Sep. 1996, pp. 1314-1331.

Menased, Daniel A., "An Analytic Model of Hierarchical Mass Storage Systems with Network-Attached Storage Devices", Sigmegtrics 1996 ACM, pp. 180-189.

Microsoft NetShow Professional Video Server Data Sheets: "How it Works" "Markets & Applications" "Netshow Pro Specifications" "Overview".

Miller, Ethan L., et al., "RAMA: A File system for Massively Parallel Computers", Proc. 12.sup.IEEE Symp. Mass Storage, 1993, pp. 163-168.

Miller, Ethan L., "RAMA: Easy Access to a High-Bandwidth Massively Parallel File System", 1995 USENIX Technical Conf., Jan. 16-20, 1995, pp. 59-70.

Muntz, Richard, et al, "Design of a Fault Tolerant Real-Time Storage System for Multimedia Applications", in 1998 Intl. Computer Performance and Deendability Symposium (IPS'98) Sep. 1998.

Narendran, B., et al, "Data Distribution Algorithms for Load Balanced Fault-Tolerant Web Access", XP-002105212, IEEE 1997, pp. 97-105.

Neufeld, Gerald, "Design of a Variable Bit Rate Continuous Media File Server for an ATM Network," University of British Columbia, Jul. 11, 1995, pp. 1-11.

O'Keefe, Matthew T., "Shared File Systems and Fibre Channel", University of Minnesota, Mar. 1998.

Oomoto, Eitetsu, et al, "OVID: Design and Implementation of a Video-Object Database System", IEEE 1993, pp. 629-643.

Ozden, Banu, "Fault-tolerant Architectures for Continuous Media Servers", Proc. ACM SIGMOD Intl. Conf., Jun. 1996, pp. 79-90.

Popek, Gerald J., et al "Replication in Focus Distributed File Systems", Proc. Workshop Mgmt. Replicated Date, 1990, pp. 5-10.

Rubin, Michael, "Efficient Dispersal of Information for Security Load Balancing, and Fault Tolerance," Journal of the Association for Computing Machinery, vol. 36, No. 2, Apr. 1989, pp. 335-448.

The RAIDbook, A Source Book for Disk Array Technology, Fourth Edition, Aug. 8, 1994, pp. ii-45.

Rakow, Thomas C., et al, "The V Video Server—Managing Analog and Digital Video Clips", ACM Computing Surveys, 1993, pp. 556-557.

Reddy, A.L. Narasimha, "Disk Scheduling in a Multimedia I/O System", Proc. 1.sup.st Intl. ACM Conf. on Multimedia, Aug. 1-6, 1993.

Rowe, Lawrence, et al., "A Continuous Media Player", Proc. 3.sup.rd Int. Workshop on Network and OS Support for Digital Audio and Video, Nov. 1992.

Rowe, Lawrence, et al., "Indexes for User Access to Large Video Databases", ISAT/ISPIE, Feb. 1994, pp. 1-10.

Rowe, Lawrence, et al., "MPEG Video in Software: Representation, Transmission, and Playback", ISAT/ISPIE, Feb. 1994, pp. 1-11.

Sandsta, Olay, et al., "Video Server on an ATM Connected Cluster of Workstations", XVII International Conference of the Chilean Computer Science Society, Nov. 1997.

Santos, Jose Renato, et al, "Comparing Random Data Allocation and Data Striping in Multi-media Servers", Sigmetrics 2000, ACM, pp. 44-55.

Santos, Jose Renato, et al, "Design of the RIO (Randomized I/O) Storage Server", UCLA CSD Tech Rp., Jun. 1997.

Satyanarayanan, Mahadev, et al, "Coda: A Highly Available File System For a Distributed Workstation Environment", IEEE, vol. 39, No. 4, Apr. 1990, pp. 447-459.

Shenoy, Prashant J. et al, "Efficient Striping Techniques for Multimedia File Servers", Dept. of Computer Sciences, University of Texas at Austin, TR 96-27, Oct. 1996.

Shenoy, Prashant J. et al, "Issues In Multimedia Server Design", Dept. of Computer Sciences, University of Texas at Austin, ACM Computing Surveys, vol. 27, No. 4, pp. 636-639, Dec. 1995.

Shillner Robert A. et al, "Simplifying Distributed File Systems Using a Shared Logical Disk", Dept. Computer Science, Princeton University, Tech. Rep. 524-96, (1996).

Siegal, Alex et al, Deceit: A Flexible Distributed File System, (1992). Proc. IEEE, 1990, pp. 15-16.

Software Patent Institute Database of Software Technologies, Interactive Computer/Video Server, Aug. 1991.

Software Patent Institute Database Software Technologies, MM Packing: Load and Storage Balancing Algorithm for Distributed Multimedia Servers, Apr. 1996.

Soltis, Steven R., et al, "The Global File System" Dept. of Electrical Engineering and Laboratory for Computational Science and Engineering, University of Minnesota, Proceedings of the Fifth NASA Goddard Space Flight Center Conference on Mass Storage Systems and Technologies, Sep. 1996, pp. 1-23.

Stephenson, Thomas et al, "Mass Storage Systems for Image Management and Distribution" Twelfth IEEE Symposium on Mass Storage System, IEEE 1993, pp. 233-240.

Teaff, Danny, et al, "The Architecture of the High Performance Storage System (HPSS)", Proc. Goddard Conf. Mass Storage, Mar. 1995.

Tetzlaff, W., et al., "Elements Of Scalable Video Servers", Digest of Papers of the Computer Society Computer Conf. (Spring) COMPCON. Technologies for the Information Superhighway. San Francisco, Mar. 5-9, 1995, Los Alamitos, IEEE Comp. Soc. Press, US, vol. Conf. 40, Mar. 5, 1995, pp. 239-248.

Tewarl, R., et al., "High availability in clustered multimedia servers", Data Engineering, 1996, Proc. of the 12.sup.th Int. Conf. in New Orleans, LA, USA, Feb. 26-Mar. 1, 1996, Los Alamitos, CA, IEEE Comp. Soc., Feb. 26, 1996, pp. 645-654.

Tewarl, Renu et al, "Design and Performance Tradeoffs in Clustered Video Servers" 1996, IEEE Proceedings of Multimedia '96, 27 pages.

Tewari, Renu et al, "Placement of Multimedita Blocks on Zoned Disks", Proceedings IS&T, SPIE Mult. Comp. Net. Jan. 1996.

Tewari, Renu et al, "Real-Time Issues for Clustered Multimedia Servers", IBM Research Report R 20020, Apr. 1995.

Tekkath, Chandramohan, et al, "Frangipani: A Scalable Distribute File System", Proc. 16.sup.th ACM Symp. Oper. Sys. Princ., Oct. 1997, pp. 224-237.

Tierney, Brian et al, "Distributed Parallel Data Storage Systems: A Scalable Approach to High Speed Image Servers", Proceedings ACM Multimedia, Oct. 1994.

Tierney, Brian et al, "The Image Server System: A High-Speed Parallell Distributed Data Server", Lawrence Berkeley Laboratory Technical Report, LBL-36002, 1994, pp. 1-12.

Tierney, Brian et al, "System Issues in Implementing High Speed Distributed Parallel Storage Systems", Proceedings USENIX Speed Networking, Aug. 1994.

Tierney, Brian L. et al, Using High Speed Networks to Enable Distributed Parallel Image Server Systems, Proceedings Supercomputing (IEEE), Nov. 1994.

Triantafillou, Peter et al, "Overlay striping and optimal parallel I/O for modern applications", Parallel Computing 24, 1998, pp. 21-43.

Venkatasubramanian, N., et al., "Load management in distributed video servers", Distributed Computing Systems, 1997, Proc. of the 17.sup.th Int. Conf. in Baltimore, MD, May 27-30, 1997, Los Alan IEEE Comp. Soc., May 27, 1997, pp. 528-535.

Walker, Bruce, et al., "The LOCUS" Distributed Operating System, University of California at Los Angeles, ACM 1983, pp. 19-70.

Wil, Uffe et al, "Hyperform; A Hypermedia System Development Environment", ACM Transactions on Information Systems, vol. 15, No. 1, Jan. 1997, pp. 1-31.

Wittenburg, T.M. et al, "An Adaptive Document Management System for Shared Multimedia Data", In Proceedings 1994 IEEE Intl. Conf. Multimedia, May 1994.

Wu, Min-You, "Scheduling for Interactive Operations In Parallel Video Servers", University at Buffalo, Department of Computer Science Technical Report 96-23, Dec. 1996.

Wong, E.W.M., Chan, S., "Modeling of Video-On-Demand Networks With Server Selection", Global Telecommunication Conference, GLOBECOM 98, The Bridge to Global Integration, IEEE, vol. 1, 8-12, pp. 54-59, vol. 1, Nov. 1998.

Wu, Min-You, "Scheduling for Large-Scale Parallel Video Servers", University at Buffalo, Department of Computer Science Technical Report 96-09, May 1996.

Dissertations, Thesis.

Alemany, Juan A., "Data Placement Algorithms for News-On-Demand Servers", A Dissertation submitted . . . University of Washington, Dec. 2, 1997, pp. ii-127.

Chee, Michael A.L. Sam, "Scheduling in the Server of a Distributed Multimedia Information System", A Thesis presented to the University of Waterloo, 1991, pp. 1-222.

Chervenak, Ann Louise, "Tertiary Storage: An Evaluation of New Applications", A Dissertation submitted . . . to University of California at Berkeley, 1994, pp. 1-175.

Dahlin, Michael Donald, "Severless Network File Systems", A Dissertation submitted . . . University of California at Berkeley, 1995, pp. 1-166.

Erickson, Grant M., "The Design and Implementation of the Global File System in Silicon Graphics' Irix", Requirements for the Degree of MS submitted to the University of Minnesota, Mar. 1998, 1-45.

Liu, Chien-Lian (Jonathan), Effective Schemes to Guarantee The Real-Time Retrieval Of Digital continuous Media, A Thesis submitted to . . . University of Minnesota, Jul. 1996, pp. 1-160.

Miller, Ethan Leo, "Storage Hierarchy Management for Scientific Computing", A Dissertation submitted . . . University of California at Berkeley, 1995, pp. 1-120.

Mitzenmacher, Michael David, "The Power of Two Choices In Randomized Load Balancing", A Dissertation submitted to . . . University of California at Berkeley, Fall 1996, pp. 1-115.

Sandhu, Harjinder Singh, "Replication and Performance in Large-Scale Distributed Systems", A Thesis submitted . . . University of Toronto, Jan. 1991, 1-117.

Siegal, Alexander, Ph.D., "Performance in flexible distributed file systems", A Dissertation . . . Cornell University, May 1992, pp. 1-163.

Soltis, Steven R., "The Design and Implementation of a Distributed File System based on Shared Network Storage", A Thesis . . . University of Minnesota, Aug. 1997, pp. 1-111.

Tan, Shih-Shan, Ph.D., A distributed file system server for networked multiprocessor workstations, a UMI Dissertation . . . Arizona State University, May 1989. Mass Storage System for Image Management and Distribution, Stephenson et al., IEEE Symposium on Mass Storage Systems, pp. 233-240, 1993.

Hierarchical Storage management in a Distributed VOD System, Brubeck et al., IEEE Multimedia, pp. 37-47, 1996.

A Hierarchical Network Storage Architecture for Video-on-Demand Services, Ying-Dar Lin et al., IEEE Transactions on Computer, pp. 355-364, 1996.

Birk, Y., "Random Raids With Selective Exploitation of Redundancy for High Performance Video Servers", Workshop on Network and Operating System Support for Digital Audio and Video, 1997.

Alemany et al., "Random Striping for News on Demand Servers", University of Washington, Technical Report, pp. 1-15, Feb. 1997.

* cited by examiner

COMPUTER SYSTEM AND PROCESS FOR TRANSFERRING MULTIPLE HIGH BANDWIDTH STREAMS OF DATA BETWEEN MULTIPLE STORAGE UNITS AND MULTIPLE APPLICATIONS IN A SCALABLE AND RELIABLE MANNER

CROSS-REFERENCE TO RELATED APPLICATIONS

This application claims the benefit under 35 U.S.C. §120, and is a continuation of:

1. U.S. patent application Ser. No. 10/883,387, filed on Jul. 1, 2004, now U.S. Pat. No. 7,111,115, which is a continuation of U.S. patent application Ser. No. 10/186,929, filed on Jul. 1, 2002, now issued as U.S. Pat. No. 6,760,808, which is a continuation of U.S. patent application Ser. No. 09/006,070, filed on Jan. 12, 1998, now issued as U.S. Pat. No. 6,415,373, which is a continuation of U.S. patent application Ser. No. 08/997,769, filed on Dec. 24, 1997, now abandoned;

2. U.S. patent application Ser. No. 10/186,929, filed on Jul. 1, 2002, now issued as U.S. Pat. No. 6,760,808, which is a continuation of U.S. patent application Ser. No. 09/006,070, filed on Jan. 12, 1998, now issued as U.S. Pat. No. 6,415,373, which is a continuation of U.S. patent application Ser. No. 08/997,769, filed on Dec. 24, 1997, now abandoned;

3. U.S. patent application Ser. No. 09/006,070, filed on Jan. 12, 1998, now issued as U.S. Pat. No. 6,415,373, which is a continuation of U.S. patent application Ser. No. 08/997,769, filed on Dec. 24, 1997, now abandoned; and 4. U.S. patent application Ser. No. 08/997,769, filed on Dec. 24, 1997, now abandoned;

all of which are incorporated herein by reference.

FIELD OF THE INVENTION

The present invention is related to computer systems for capture, authoring and playback of multimedia programs and to distributed computing systems.

BACKGROUND OF THE INVENTION

There are several computer system architectures that support distributed use of data over computer networks. These computer system architectures are used in applications such as corporate intranets, distributed database applications and video-on-demand services.

Video-on-demand services, for example, typically are designed with an assumption that a user will request an entire movie, and that the selected movie has a substantial length. The video-on-demand server therefore is designed to support read-only access by several subscribers to the same movie, possibly at different times. Such servers generally divide data into several segments and distribute the segments sequentially over several computers or computer disks. This technique commonly is called striping, and is described, for example, in U.S. Pat. Nos. 5,473,362, 5,583,868 and 5,610,841. One problem with striping data for movies over several disks is that failure of one disk or server can result in the loss of all movies, because every movie has at least one segment written on every disk.

A common technique for providing reliability in data storage is called mirroring. A hybrid system using mirroring and sequential striping is shown in U.S. Pat. No. 5,559,764 (Chen et al.). Mirroring involves maintaining two copies of each storage unit, i.e., having a primary storage and secondary backup storage for all data. Both copies also may be used for load distribution. Using this technique however, a failure of the primary storage causes its entire load to be placed on the secondary backup storage.

Another problem with sequentially striping data over several disks is the increased likelihood of what is called a Aconvoy effect. A convoy effect occurs because requests for data segments from a file tend to group together at a disk and then cycle from one disk to the next (a Aconvoy≅). As a result, one disk may be particularly burdened with requests at the one time while other disks have a light load. In addition, any new requests to a disk must wait for the convoy to be processed, thus resulting in increased latency for new requests. In order to overcome the convoy effect, data may be striped in a random fashion, i.e., segments of a data file is stored in a random order among the disks rather than sequentially. Such a system is described in A Design and Performance Tradeoffs in Clustered Video Servers, by R. Tewari, et. al., in *Proceedings of Multimedia '96*, pp. 144-150. Such a system still may experience random, extreme loads on one disk, however, due to the generally random nature of data accesses.

None of these systems is individually capable of transferring multiple, independent, high bandwidth streams of data, particularly isochronous media data such as video and associated audio data, between multiple storage units and multiple applications in a scalable and reliable manner. Such data transfer requirements are particularly difficult in systems supporting capture, authoring and playback of multimedia data. In an authoring system in particular, data typically is accessed in small fragments, called clips, of larger data files. These clips tend to be accessed in an arbitrary or random order with respect to how the data is stored, making efficient data transfer difficult to achieve.

SUMMARY OF THE INVENTION

Data is randomly distributed on multiple storage units connected with multiple applications using a computer network. The data is divided into segments. Each segment is copied, and each copy is stored on a different one of the storage units. The selection of each storage unit on which a copy of a segment is stored is random or pseudorandom and may be independent of the storage units on which other segments of the data are stored. Each segment is stored on at least two of the storage units.

This random distribution of multiple copies of segments of data improves both scalability and reliability. For example, when an application requests a selected segment of data, the request may be processed by the storage unit with the shortest queue of requests so that random fluctuations in the load applied by multiple applications on multiple storage units are balanced statistically and more equally over all of the storage units. Since the data is processed in terms of its segments, data fragments or clips also are processed as efficiently as all of the data. The applications may request data transfer from a storage unit only when that transfer would be efficient and may request storage units to preprocess read requests. In certain cases, bandwidth utilization on a computer network is optimized by scheduling data transfers among the clients and storage units. In addition, if one of the storage units fails, its load is distributed randomly and nearly uniformly over the remaining storage units. Procedures for recovering from failure of a storage unit also may be provided.

The storage units and applications also may operate independently and without central control. For example, each client may use only local information to schedule communication with a storage unit. Storage units and applications therefore may be added to or removed from the system. As a result, the system is expandable during operation.

This combination of techniques results in a system which can transfer multiple, independent high-bandwidth streams of data between multiple storage units and multiple applications in a scalable and reliable manner.

Accordingly, in one aspect, a distributed data storage system includes a plurality of storage units for storing data, wherein copies of segments of data stored on the storage units are randomly distributed among the plurality of storage units. Each copy of each segment may be stored on a different one of the storage units. Each copy of each segment may be assigned to one of the plurality of storage units according to a probability distribution defined as a function of relative specifications of the storage units. The distributed data storage system may include a computer-readable medium having computer-readable logic stored thereon and defining a segment table accessible by a computer using an indication of a segment of data to retrieve indications of the storage units from the plurality of storage units on which the copies of the segment are stored. The plurality of storage units may include first, second and third storage units connected to a computer network.

In another aspect, a file system for a computer enables the computer to access remote independent storage units over a computer network in response to a request, from an application executed on the computer, to read data stored on the storage units. Copies of segments of the data are randomly distributed among the plurality of storage units. The file system is responsive to the request to read data, to select, for each segment of the selected data, one of the storage units on which the segment is stored. Each segment of the requested data is read from the selected storage unit for the segment. The data is provided to the application when the data is received from the selected storage units. In this file system, the storage unit may be selected such that a load of requests on the plurality of storage units is substantially balanced. The storage unit for the segment may be selected according to an estimate of which storage unit for the segment has a shortest estimated time for servicing the request.

More particularly, the file system may request data from one of the storage units, indicating an estimated time. If the first storage unit rejects the request, the file system may request data from another of the storage units, indicating another estimated time. The file system requests the data from the first storage unit when the second storage unit rejects the request. Each storage unit rejects a request for data when the request cannot be serviced by the storage unit within the estimated time. The storage unit accepts a request for data when the request can be serviced by the storage unit within the estimated time.

The file system may read each segment by scheduling the transfer of the data from the selected storage unit such that the storage unit efficiently transfers data. More particularly, the file system may request transfer of the data from the selected storage unit, indicating a waiting time. The data may be requested from another storage unit when the selected storage unit rejects the request to transfer the data, or the file system may request the data from the same storage unit at a later time. Each storage unit rejects a request to transfer data when the data is not available to be transferred from the storage unit within the indicated waiting time. The storage unit transfers the data when the selected storage unit is able to transfer the data within the indicated waiting time.

In another aspect, a file system for a computer enables the computer to access remote independent storage units over a computer network in response to a request, from an application executed on the computer, to store data on the storage units. The file system is responsive to the request to store the data to divide the data into a plurality of segments. Copies of each segment are randomly distributed among the plurality of storage units. The file system confirms to the application whether the data is stored.

In this file system, the random distribution of data may be accomplished by selecting, for each segment, at least two of the storage units at random and independent of the storage units selected for other segments. The selected storage units may be requested to store the data for each segment. The file system may select a subset of the storage units, and may selecting the storage units for storing the segment from among the storage units in the selected subset.

The functionality of the file system also may be provided by another application or through a code library accessible through an application programming interface. Accordingly, another aspect is the client or the process implemented thereby to perform read or write functions, including selection of a storage unit and scheduling of network transfer. Another aspect is the storage units or the process implemented thereby to perform read or write functions, including selection of a storage unit and scheduling of network transfer. Another aspect is a distributed computer system implementing such functionality. These operations may be performed by a client or a storage unit using only local information so as to enable a system to be readily expandable.

In another aspect, data is recovered in a distributed data storage system having a plurality of storage units for storing the data, wherein copies of segments of the data stored on the storage units are randomly distributed among the plurality of storage units, when failure of one of the storage units is detected. To recover the data, segments of which copies were stored on the failed storage unit are identified. The storage units on which another copy of the identified segments was stored are identified. A copy of the identified copies is then randomly distributed among the plurality of storage units. Such data recovery may be used in combination with the read and write functionality of a file system or distributed storage system described herein.

In another aspect, streams of video data are combined to produce composited video data which is stored in a distributed system comprising a plurality of storage units for storing video data, wherein copies of segments of the video data stored on the storage units are randomly distributed among the plurality of storage units. The streams of video data are read from the plurality of storage units. These streams of video data are combined to produce the composited video data. The composited video data is divided into segments. Copies of the segments of the composited video data are randomly distributed among the plurality of storage units. The reading and storage of data may be performed using the techniques described herein.

DETAILED DESCRIPTION

In the following detailed description, which should be read in conjunction with the attached drawings, example embodiments of the invention are set forth. All references cited herein are hereby expressly incorporated by reference.

Several problems arise in the design of a scalable and reliable distributed system that supports transfer of data, particularly multiple, independent streams of high-bandwidth, time-sensitive data such as motion video and associated audio and other temporally continuous media, between multiple applications and multiple storage units. In such a system, an application, for example that is used to author a motion video program, may access randomly several small portions of several different files that may be distributed over several storage units. Several applications may require immediate and simultaneous access to the same data, and any application should be able to access any piece of media at any time. In a system that is used for broadcasting or other time sensitive playback, fault tolerance also is desirable. Finally, the system should be both expandable and scalable in a manner that simplifies the addition of new storage units and new applications even while the system is in operation. Other desirable characteristics of such a system include a long mean time to failure, no single point of failure, the capability of being repaired rapidly and while operating, tolerance to storage unit failure without disrupting operation, and the capability of recovering lost data.

In one embodiment, the system includes multiple applications connected by a computer network to multiple separate and independent storage units for storing data. The data is divided into segments. Each segment is copied and each copy is stored on a different one of the storage units. The selection of each storage unit is random or pseudorandom and may be independent of the storage units selected for other segments, such as the immediately preceding segment. The replication and random distribution of data both increases the ability of the system to efficiently transfer data in both directions between applications and storage and improves fault tolerance. By further controlling which storage unit is accessed by a particular application, such as by selecting the storage unit with the shortest queue of requests, random fluctuations in load are distributed approximately evenly over all of the storage units. Applications also may request data transfer with a storage unit only when the transfer would be efficient. In addition, by scheduling communication over the network appropriately, network congestion may be reduced and network bandwidth may be used more efficiently. Central control points may be eliminated by having each client use local information to schedule communication with a storage unit.

Figure 1:
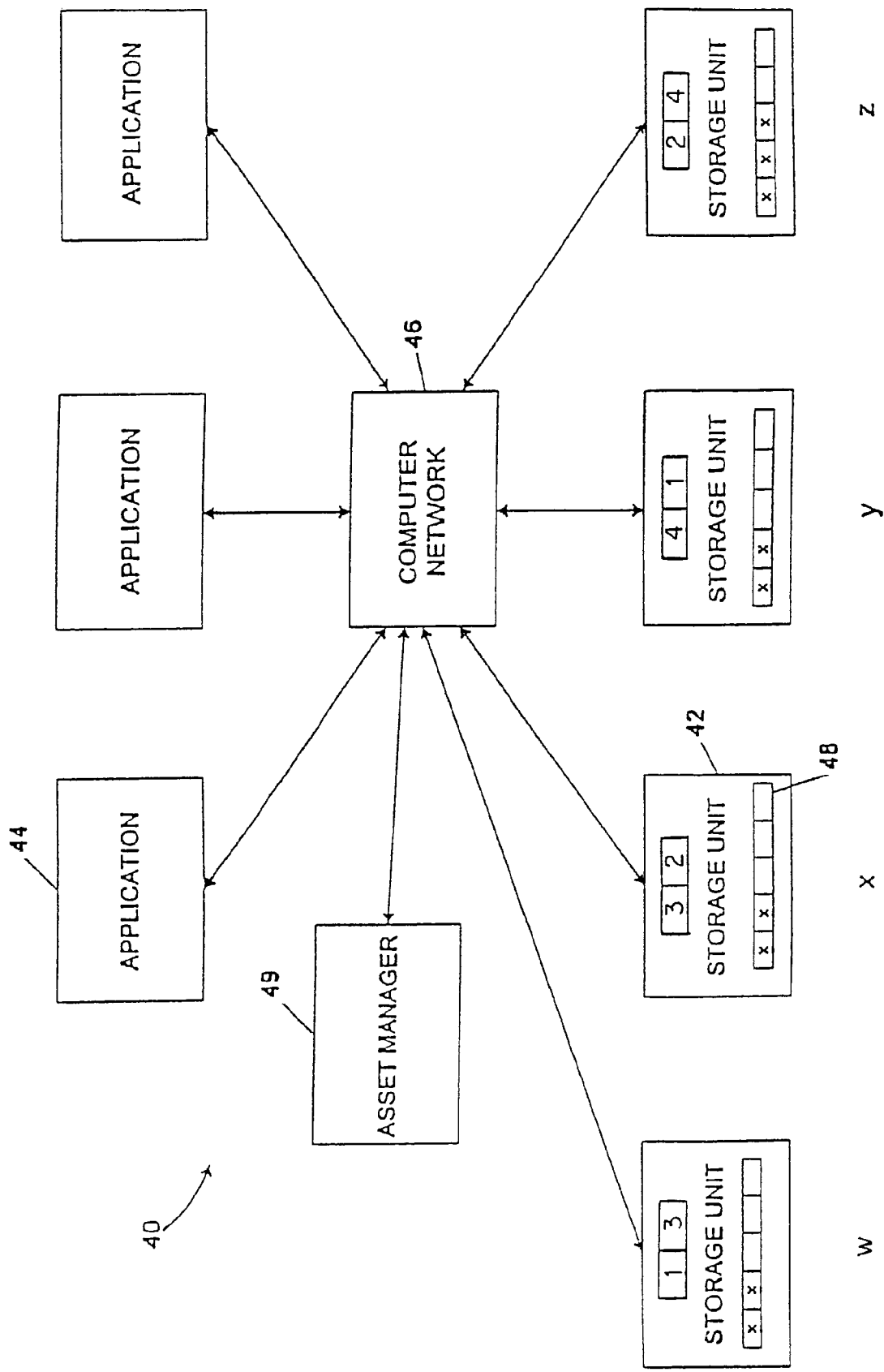
FIG. 1 is a block diagram of an example computer system with which the present invention may be used.

FIG. 1 illustrates an example computer system 40 in which the present invention may be used. The computer system includes a plurality of storage units 42. A storage unit is a device with a nonvolatile computer-readable medium, such as a disk, on which data may be stored. The storage unit also has faster, typically volatile, memory into which data is read from the medium. Each storage unit also has its own independent controller which responds to requests for access, including but not limited to read and write access, to data stored on the medium. For example, the storage unit 42 may be a server computer which stores data in a data file in the file system of the server. There may be an arbitrary number of storage units in the computer system 40.

Applications 44 are systems that request access to the storage units 42 via requests to the storage units over a computer network 46. The storage units 42 may deliver data to or receive data from the applications 44 over the computer network 46. Applications 44 may include systems which capture data received from a digital or analog source for storing the data on the storage units 42. Applications 44 also may include systems which read data from the storage units, such as systems for authoring, processing or playback of multimedia programs. Other applications 44 may perform a variety of fault recovery tasks. Applications 44 also may be called Aclients.≅ One or more catalog managers 49 also may be used. A catalog manager is a database, accessible by the applications 44, that maintains information about the data available on the storage units 42. This embodiment of the present invention may be used to implement a broadcast news system such as shown in PCT Publication WO97/39411, dated Oct. 23, 1997.

In the present invention, data to be stored on the storage units 42 is divided into segments. Each segment is copied. Each copy is stored on a different one of the storage units 42. The selection of the storage units on which the copies of a segment are stored is random or pseudorandom and may be independent of the storage units on which other segments of the data are stored. In one embodiment, two consecutive segments are not stored on the same storage unit. As a result, each segment is stored on at least two of the storage units 42. The probability distribution for selecting a storage unit for storing a particular copy of a segment may be uniform over all of the storage units where the specifications, such as capacity, bandwidth and latency, of the storage units are similar. This probability distribution also may be a function of the specifications of each storage unit. This random distribution of multiple copies of segments of data improves both scalability and reliability.

An example of this random distribution of copies of segments of data is shown in FIG. 1. In FIG. 1, four storage units 42, labeled w, x, y and z, store data which is divided into four segments labeled 1, 2, 3 and 4. An example random distribution of the segments and their copies is shown, where: segments 1 and 3 are stored on storage unit w; segments 3 and 2 are stored on storage unit x; segments 4 and 1 are stored on storage unit y; and segments 2 and 4 are stored on storage unit z.

Figure 2:
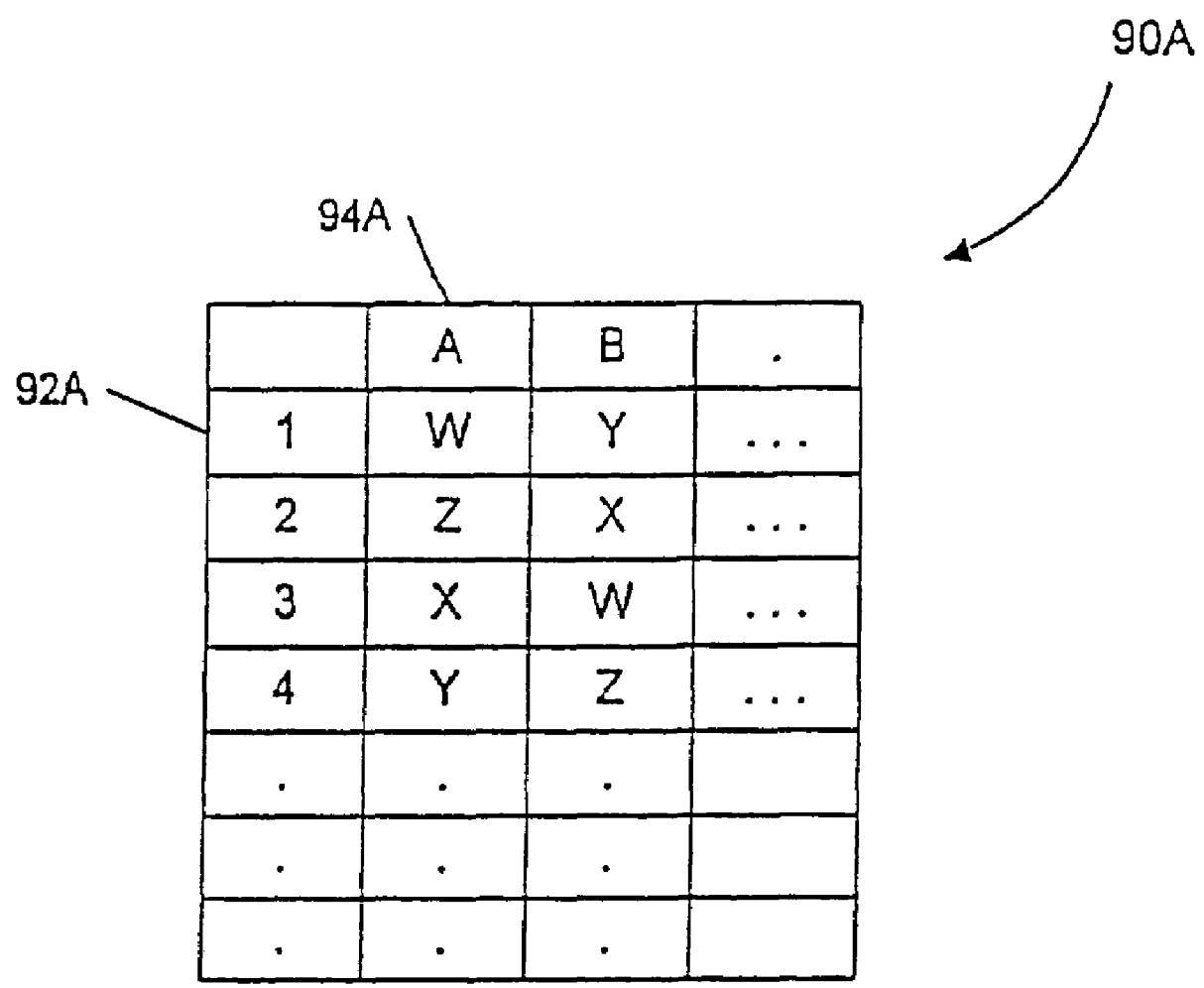
FIG. 2 illustrates a data structure mapping segments of data to storage units 42 in FIG. 1.

The random distribution of segments may be represented in and tracked by a segment table 90, or catalog, such as shown in FIG. 2. In particular, for data captured from a given source or for data from a given file, each segment, represented by a row 92, has two copies, called A and B, which are represented by columns 94. The columns 94 in the segment table 90 may be referred herein to as the AA list≅ or AB list,≅ respectively. Each list alternatively may be represented by a seed number for a pseudorandom number generator that is used to generate the list, or by a list or other suitable data structure such as a record, linked list, array, tree, table, etc. When using a pseudorandom number generator, care should be taken to ensure that the storage units indicated by the numbers for any given segment in the A and B lists are not the same. The contents of columns 94 indicate the storage unit on which a copy of a segment is stored. Each segment table, or file map, can be stored separately from other segment tables. Segment tables may be stored together, as a catalog. Catalogs may be stored on a catalog manager 49, at individual clients, at a central database, or may be distributed among several databases or clients. Separate catalogs could be maintained, for example, for different types of media programs. For example, a broadcast news organization may have separate catalogs for sports news, weather, headline news, etc. The catalogs also may be stored on the storage units in the same manner as other data, in which case each client could use a seed for a random number generator to access the catalog. Such catalogs may be identified by other clients to access data or to handle recovery requests, for example, by sending a network broadcast message to all catalog managers or clients to obtain a copy of the catalog or of an individual segment table.

In order to access the segments of data, each segment should have a unique identifier. The copies of the segments may have the same unique identifier. The unique identifier for a segment is a combination of a unique identifier for the source, such as a file, and a segment number. The unique identifier for the source or file may be determined, for example, by a system time or other unique identifier determined when data is captured from the source or at the time of creation of the file. A file system, as described below, may access the catalog manager to obtain the segment table for each source or file which lists the segment identifiers and the storage units on which the copies of the segments are stored. Each storage unit also may have a separate file system which contains a directory of the segment identifiers and the location on that storage unit where they are stored. Application programs executed by a client may use the identifiers of a source or file, and possibly a range of bytes within the source or file to request data from the file system of the client. The file system of the client then may locate the segment table for the source or file, determine which segments need to be accessed and select a storage unit from which the data should be read for each segment, using the unique segment identifiers.

Referring again to FIG. 1, when an application 44 requests access to a selected segment of data on one of the storage units 42, the storage unit places the request on a queue 48 that is maintained for the storage unit. Applications may make such requests independently of each other or any centralized control, which makes the system more readily scalable. The selection of a storage unit to which a request is sent may be controlled such that random fluctuations in the load applied by multiple applications 44 on multiple storage units 42 are balanced statistically and more equally over all of the storage units 42. For example, each request from an application 44 may be processed by the storage unit that has the shortest queue of requests. In addition, the transfer of data between applications and storage units may be scheduled to reduce network congestion. The requests for data may be performed in two steps: a pre-read request which transfers the data from disk to a buffer on the storage unit, and a network transfer request which transfers data over the network from the buffer to the application. To process these two different requests, the queue 48 may include a disk queue and a network queue.

This combination of randomly distributed copies of data, the selection of a storage unit for read access based on the relative loads of the storage units, and the scheduling of data transfer over the network provides a system which can transfer multiple, independent high-bandwidth streams of data in both directions between multiple storage units and multiple applications in a scalable and reliable manner.

Figure 3:
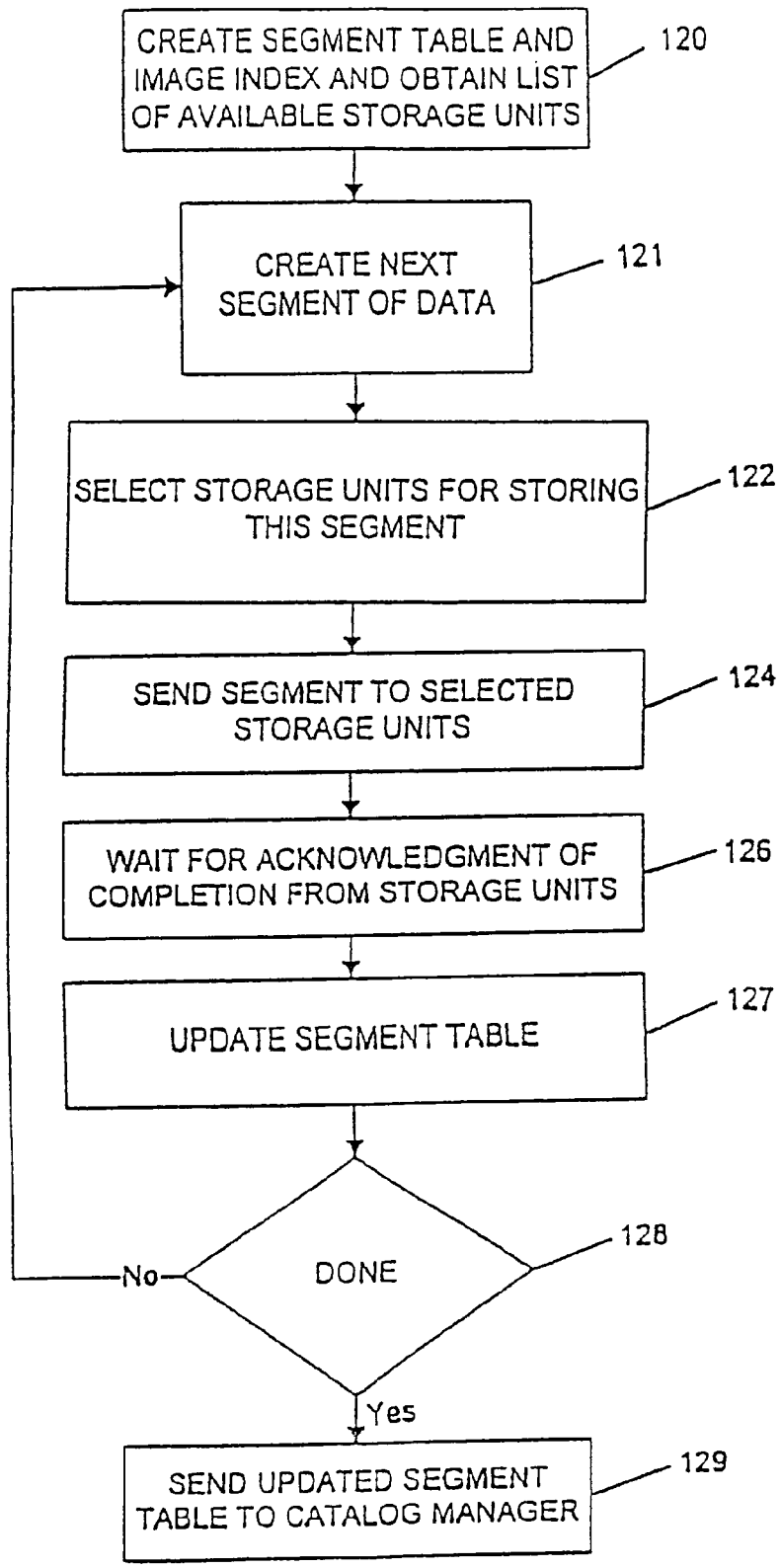
FIG. 3 is a flowchart describing how data may be captured and distributed among several storage units in one embodiment of the invention.

Referring now to FIG. 3, an example process for storing multiple copies of segments of data in a randomly distributed manner over the several storage units will now be described in more detail. The following description is based on the real-time capture of motion video data. The example may be generalized to other forms of data, including, but not limited to other temporally continuous media, such as audio, or discrete media such as still images or text, or even other data such as sensory data.

It is generally well-known how to capture real-time motion video information into a computer data file, such as described in U.S. Pat. Nos. 5,640,601 and 5,577,190. This procedure may be modified to include steps for dividing the captured data into segments, and copying and randomly distributing the copies of the segments among the storage units. First, in step 120, the capturing system creates a segment table 90 (FIG. 2). An image index, that maps each image to an offset into the stream of data to be captured, also typically is created. The indexed images may correspond to, for example, fields or frames. The index may refer to other sample boundaries, such as a period of time, for other kinds of data, such as audio. The capturing system also obtains a list of available storage units. One way to identify which storage units are available is described in more detail below in connection with FIGS. 10-12.

A segment of the data is created by the capturing system in step 121. The size of the segment may be, for example, one quarter, one half or one megabyte for motion video information. Audio information may be divided into, for example, segments having a size such as one-quarter megabyte. In order to provide alignment, if possible, of the segment size to divisions of storage and transmission, the size of the segment may be related, i.e., an integer multiple of, to an uncompressed or fixed data rate, disk block and track size, memory buffer size, and network packet (e.g., 64K) and/or cell sizes (e.g., 53 bytes for ATM). If the data is uncompressed or is compressed using fixed-rate compression, the segment may be divided at temporal sample boundaries which provides alignment between the image index and the segment table. Generally speaking, the segment size should be driven to be larger in order to reduce system overhead, which is increased by smaller segments. On the other hand, there is an increased probability that a convoy effect could occur if the amount of data to be stored and segment size are such that the data is not distributed over all of the storage units. Additionally, there is an increased latency to complete both disk requests and network requests when the segment sizes are larger.

Next, at least two of the storage units 42 are selected, in step 122, by the capturing system from the list of storage units available for storing the selected segment. Selection of the storage units for the copies of one segment is random or pseudorandom. This selection may be independent of the selection made for a previous or subsequent segment. The set of storage units from which the selection is made also may be a subset of all of the available storage units. The selection of a set of storage units may be random or pseudorandom for each source or file. The size of this subset should be such that each storage unit has at least two different segments of the data in order to minimize the likelihood of occurrence of a convoy effect. More particularly, the data should be at least twice as long (in segments) as the number of storage units in the set. In addition, the size of the subset should be limited to reduce the probability that two or more storage units in the subset fail, i.e., a double fault may occur, at any given time. For example, the probability that two storage units out of five could fail is less than the probability that two storage units out of one hundred could fail, so the number of storage units over which data is distributed should be limited. However, there is a trade off between performance and subset size. For example, using randomly selected subsets of ten out of one-hundred storage units, when two of the one-hundred storage units fail, then ten percent of the files are adversely affected. Without subsets, one hundred percent of the files typically would be adversely affected.

In the rare likelihood of a double fault, i.e., where two or more storage units fail, a segment of data may be lost. In a standard video stream, the loss of a segment might result in a loss of one or two frames in every minute of program material. The frequency of such a fault for a given source or file is a function of its bandwidth and the number of storage units. In particular, where:
  s=size of lost data in megabytes (MB),
  n=initial number of storage units,
  b=average bandwidth of storage units in MB per second,
  MTBF=mean time between failures,
  MTTR=mean time to repair or replace,
  MTDF=mean time for a double fault failure, and
  SMTBF=total system mean time between failures, $$SMTBF = \frac{MTBF}{n}, \text{ and } MTDF = \frac{1}{MTTR} * \frac{MTBF}{n} * \frac{MTBF}{(n-1)}.$$

As an example, in a system with 100 storage units, each with a capacity of 50 gigabytes, where MTTR is one hour and MTBF is 1000 hours or six weeks, there likely will be 115 years to double fault failure. If the MTTR is increased to twenty-four hours, then there likely will be 4.8 years to double fault failure.

After two storage units are selected, the current segment then is sent to each of the selected storage units in step 124 for storage. These write requests may be asynchronous rather than sequential. The capture system then may wait for all storage units to acknowledge completion of the storage of the segment in the step 126. When data must be stored in real time while being captured, the data transfer in step 124 may occur in two steps, similar to read operations discussed in more detail below. In particular, the client first may request a storage unit to prepare a free buffer for storing the data. The storage unit may reply with an estimated time for availability of the buffer. When that estimated time is reached, the capture system can request the storage unit to receive the data. The storage unit then can receive the data in its buffer, then transfer the data in its buffer to its storage medium and send an acknowledgment to the capture system.

If a time out occurs before an acknowledgment is received by the capturing system, the segment may be sent again either to the same storage unit or to a different storage unit. Other errors also may be handled by the capturing system. The operations which ensure successful storage of the data on the selected units may be performed by a separate thread for each copy of the segment.

After the data is successfully stored on the storage units, the segment table 90 is updated by the capturing system in step 127. If capture is complete, as determined in step 128, then the process terminates; otherwise, the process is repeated for the next segment by returning to step 121. The segment table may be maintained, e.g., in main memory, at the capture system as part of the file system. While the capturing system manages the segment table and selection of storage units in this example, other parts of the system could coordinate these activities as well, such as the catalog manager 49. The updated segment table may be sent to, for example, the catalog manager in step 129. Alternatively, the catalog manager may produce the segment table by using accumulated knowledge of system operation, and may send this table to the capture system on request.

Figure 4:
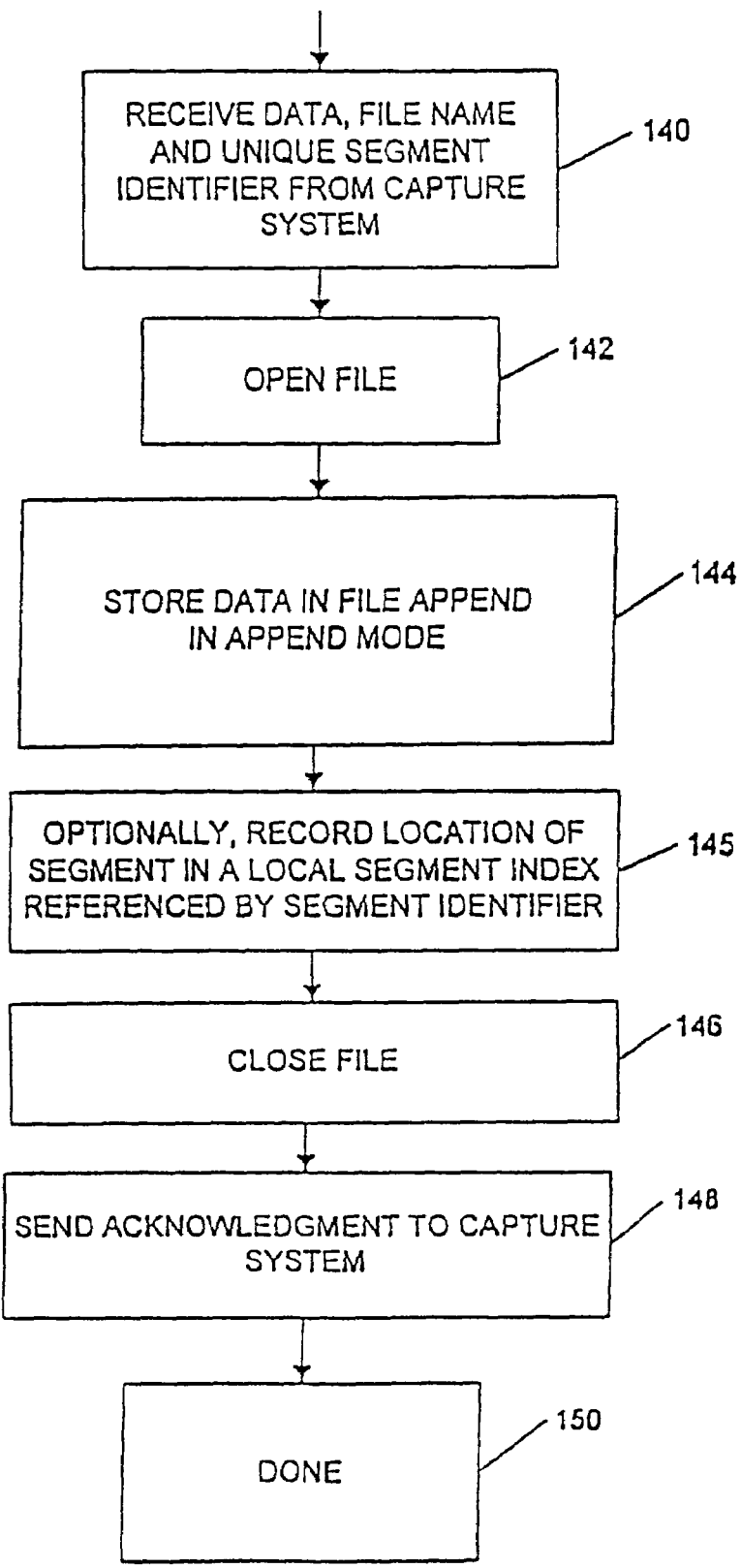
FIG. 4 is a flowchart describing how storage units may process requests for storing data in one embodiment of the invention.

FIG. 4 is a flowchart describing in more detail how a storage unit stores a segment of the captured data. The storage unit receives the segment of data from a capturing system in step 140 and stores the data in a buffer at the storage unit. Assuming the storage unit uses data files for storage, the storage unit opens a data file in step 142 and stores the data in the data file in step 144. The catalog manager may specify the location where the segment should be stored. The data may be appended to an existing data file or may be stored in a separate data file. As discussed above, the storage unit or the catalog manager may keep track of segments by using a unique identifier for each segment and by storing a table mapping the segment identifier to its location on the storage unit, in step 145. This table may implement the data file abstraction on the storage unit. When the storage unit actually writes data to its main storage may depend on other read and write requests pending for other applications. The management of these concurrent requests is addressed in more detail below. The file then may be closed in step 146. An acknowledgment may be sent to the capturing system in step 148.

When the process of FIGS. 3 and 4 is complete, the captured data is randomly distributed, with at least two copies for each segment, over several storage units. Multiple applications may request access to this data. The manner in which this access occurs is likely to be random. Accordingly, it should be apparent that any storage unit may receive multiple requests for both reading data from and writing data to files stored on the storage unit from multiple applications. In order to manage the requests, a queue 48 of requests is maintained by each of the storage units 42, as mentioned above. In the following description of an example embodiment of the invention, a storage unit maintains two queues: one for requests for disk access, and another for requests for network transfers. One embodiment of these disk and network queues is described in more detail below in connection with FIG. 19.

When data is requested by an application program executed on a client 44, a storage unit is selected to satisfy the request, since each segment of data is stored on at least two storage units. The segment table 90 for the requested data is used for this purpose. The selection of a storage unit may be performed by the application program requesting the data, by a file system of the client executing the application program, through coordination among storage units or by another application such as a catalog manager. The selection may be random or pseudorandom, or based on a least recently used algorithm, or based on the relative lengths of the queues of the storage units. By selecting a storage unit based on the relative lengths of the queues on the available storage units, the load of the multiple applications may be distributed more equally over the set of storage units. Such selection will be described in more detail below in connection with FIG. 16-18.

More details of a particular embodiment of the invention will now be described. For this purpose, the storage unit 42 may be implemented as a server or as an independently controlled disk storage unit, whereas the applications 44 are called clients. Clients may execute application programs that perform various tasks. A suitable computer system to implement either the servers or clients typically includes a main unit that generally includes a processor connected to a memory system via an interconnection mechanism, such as a bus or switch. Both the server and client also have a network interface to connect them to a computer network. The network interface may be redundant to support fault tolerance. The client also may have an output device, such as a display, and an input device, such as a keyboard. Both the input device and the output device may be connected to the processor and memory system via the interconnection mechanism.

It should be understood that one or more output devices may be connected to the client system. Example output devices include a cathode ray tube (CRT) display, liquid crystal displays (LCD), printers, communication devices such as a modem or network interface, and video and audio output. It should also be understood that one or more input devices may be connected to the client system. Example input devices include a keyboard, keypad, trackball, mouse, pen and tablet, communication devices such as a modem or network interface, video and audio digitizers and scanner. It should be understood the invention is not limited to the particular input or output devices used in combination with the computer system or to those described herein.

The computer system may be a general purpose computer system which is programmable using a high level computer programming language, such as the AC≅ and AC++≅ programming languages. The computer system also may be specially programmed, special purpose hardware. In a general purpose computer system, the processor is typically a commercially available processor, of which the series x86 processors such as the Pentium II processor with MMX technology, available from Intel and similar devices available from AMD and Cyrix, the 680X0 series microprocessors available from Motorola, the Alpha series microprocessor available from Digital Equipment Corporation, and the PowerPC processors available from IBM are examples. Many other processors are available. Such a microprocessor may execute a program called an operating system, of which the WindowsNT, Windows 95, UNIX, IRIX, Solaris, DOS, VMS, VxWorks, OS/Warp, Mac OS System 7 and OS8 operating systems are examples. The operating system controls the execution of other computer programs and provides scheduling, debugging, input/output control, compilation, storage assignment, data management and memory management, and communication control and related services. The processor and operating system define a computer platform for which application programs in high-level programming languages are written.

Each server may be implemented using an inexpensive computer with a substantial amount of main memory, e.g., much more than thirty-two megabytes, and disk capacity, e.g., several gigabytes. The disk may be one or more simple disks or redundant arrays of independent disks (RAID) or a combination thereof. For example, the server may be a Pentium or 486 microprocessor-based system, with an operating system such as WindowsNT or a real-time operating system such as VxWorks. The authoring system, capturing system and playback system may be implemented using platforms that currently are used in the art for those kinds of products. For example, the MEDIACOMPOSER authoring system from Avid Technology, Inc., of Tewksbury, Mass., uses a Power Macintosh computer from Apple Computer, Inc., that has a PowerPC microprocessor and a MacOS System 7 operating system. A system based on a Pentium II processor with MMX technology from Intel, with the WindowsNT operating system, also may be used. Example playback systems include the ASPACE≅ system from Pluto Technologies International Inc., of Boulder, Colo., or the AIRPLAY system from Avid Technology which uses a Macintosh platform. The catalog manager may be implemented using any platform that supports a suitable database system such as the Informix database. Similarly, an asset manager that tracks the kinds of data available in the system may be implemented using such a database.

The memory system in the computer typically includes a computer readable and writeable nonvolatile recording medium, of which a magnetic disk, optical disk, a flash memory and tape are examples. The disk may be removable, such as a floppy disk or CD-ROM, or fixed, such as a hard drive. A disk has a number of tracks in which signals are stored, typically in binary form, i.e., a form interpreted as a sequence of ones and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

It should be understood the invention is not limited to a particular computer platform, particular processor, or particular high-level programming language. Additionally, the computer system may be a multiprocessor computer system or may include multiple computers connected over a computer network.

As stated above, each storage unit 42, if accessed through server, and each application 44 may have a file system, typically part of the operating system, which maintains files of data. A file is a named logical construct which is defined and implemented by the file system to map the name and a sequence of logical records of data to locations on physical storage media. While the file system masks the physical locations of data from the application program, a file system generally attempts to store data of one file in contiguous blocks on the physical storage media. A file may specifically support various record types or may leave them undefined to be interpreted or controlled by application programs. A file is referred to by its name or other identifier by application programs and is accessed through the file system using commands defined by the operating system. An operating system provides basic file operations for creating a file, opening a file, writing a file, reading a file and closing a file. These operations may be synchronous or asynchronous, depending on the file system.

In the present invention, the data of a file or source is stored in segments, of which copies are randomly distributed among multiple storage units.

Generally speaking for most file systems, in order to create a file, the operating system first identifies space in the storage which is controlled by the file system. An entry for the new file is then made in a catalog which includes entries indicating the names of the available files and their locations in the file system. Creation of a file may include allocating certain available space to the file. In one embodiment of the invention, a segment table for the file may be created. Opening a file typically returns a handle to the application program which it uses to access the file. Closing a file invalidates the handle. The file system may use the handle to identify the segment table for a file.

In order to write data to a file, an application program issues a command to the operating system which specifies both an indicator of the file, such as a file name, handle or other descriptor, and the information to be written to the file. Generally speaking, given the indicator of the file, an operating system searches the directory to find the location of the file. The data may be written to a known location within the file or at the end of the file. The directory entry may store a pointer, called a write pointer, to the current end of the file. Using this pointer, the physical location of the next available block of storage may be computed and the information may be written to that block. The write pointer may be updated in the directory to indicate the new end of the file. In one embodiment of the invention, the write operation randomly distributes copies of segments of the file among the storage units and updates the segment table for the file.

In order to read data from a file, an application program issues a command to the operating system specifying the indicator of the file and memory locations assigned to the application where the read data should be placed. Generally speaking, an operating system searches its directory for the associated entry given the indicator of the file. The application program may specify some offset from the beginning of the file to be used, or, in a sequential file system, the directory may provide a pointer to a next block of data to be read. In one embodiment of the invention, the selection of a storage unit and the scheduling of data transfer is implemented as part of the read operation of the file system of the client.

The client may use a file system or a special code library with a defined application programming interface (API) to translate requests for portions of a file into requests for segments of data from selected storage units. The storage unit may have its own file system which may be entirely separate from the client file system. All of the segments on a storage unit may be stored, for example, in a single file at the storage unit. Alternatively, the client file system may use the storage units over the network as raw storage, using the catalog manager and segment tables to implement the file abstraction. In such a case, the segment table for a file also may indicate the locations of each segment on the storage units selected for the segment.

A primary advantage of using a file system is that, for an application program, the file is a logical construct which can be created, opened, written to, read from and closed without any concern for the physical storage medium or location on that medium used by the operating system to store the data. In a network file system, the file system manages requests for data from a specified file from the various storage units, without requiring an application program to know any details about the physical storage where the data is stored or the computer network. If the storage unit has its own independent file system, the client file system also need not know details of the storage mechanism of the storage units. In the present invention, the storage units may use, for example, the file system associated with their own operating system, such as the WindowsNT file system or the file system of a real time operating system such as VxWorks, or a file system that allows asynchronous operations. As stated above, the storage units are interconnected with the clients and, optionally, the catalog manager using a computer network. A computer network is a set of communications channels interconnecting a set of computer devices or nodes that can communicate with each other. The nodes may be computers such as the clients, storage units and catalog managers, or communication devices of various kinds, such as switches, routers, gateways and other network devices. The communication channels may use a variety of transmission media including optical fibers, coaxial cable, twisted copper pairs, satellite links, digital microwave radio, etc.

A computer network has a topology which is the geometrical arrangement of the connection of the nodes by the network. Kinds of topologies include point-to-point connection, linear bus, ring connection, star connection, and multiconnected networks. A network may use various combinations of these basic topologies. In the present invention, the topology will vary depending on the physical installation. A non-blocking, switch-based network in which each node, i.e., client or storage unit, is connected directly to the same switch may be used. In some implementations, multiple clients and storage units may be connected on a physical loop or subnetwork which are interconnected into a switching fabric. The system also may be connected using multiple switches.

The network also has a network architecture which defines the protocols, message formats, and other standards to which communication hardware and software must conform in order for communication to occur between devices on the network. A commonly-used network architecture is the International Standards Organization seven-layer model known as the Open Systems Interconnection reference model. The seven layers are the application, presentation, session, transport, network, link and physical layers. Each machine communicates with any other machine using the same communication protocol at one of these layers.

In one embodiment, the link layer preferably is one that retains the order of packets as they are received at the client in order to avoid the potential for an unlimited latency. Accordingly, suitable link layer protocols include asynchronous transfer mode (ATM) networks, such as OC3, OC12, or higher bandwidth networks. An ATM system operating in the AAL5 mode is preferable. Ethernet networks with 100 Tx to gigabit (1,000 Tx) capacity also may provide efficient packet transmission from the source to the destination. Suitable Ethernet network platforms are available, for example, from 3Com of Santa Clara, Calif. An example ATM system is available from Fore Systems of Warrendale, Pa. or Giga-Net, of Concord, Mass. A FibreChannel, FDDI or HIPPI network also may be used. The different clients, the catalog manager and the storage units all may communicate using the link layer protocol. Communication at this layer also reduces overhead due to memory copies performed to process encapsulated data for each layer=s protocol. A bandwidth distributed network file system from Polybus Systems Corporation in Tyngsboro, Mass., may be used.

Having now described computer platforms for an embodiment of a system in accordance with the invention, some additional operations and details of one embodiment will now be described.

In one embodiment of this system, there are processes for maintaining the storage units and the data stored on the storage units. For example, fault recovery procedures may involve the creation of additional copies of a file. Additionally, files may be deleted or added based on the need for availability of, i.e., reliability of access to, the file. Finally, some maintenance procedures may involve deleting files on a storage unit, copying the files to another storage unit and removing the storage unit from the system. A file also may be archived, or removed from the system to archival storage. These processes will now be described in more detail in connection with FIGS. 5-9. Such data management processes may be performed by the catalog manager, another storage unit, or a client. The performance of these processes by a client would not occupy the resources of the catalog manager or storage units, which may be used for other more important tasks, such as replying to client requests for data.

Figure 5:
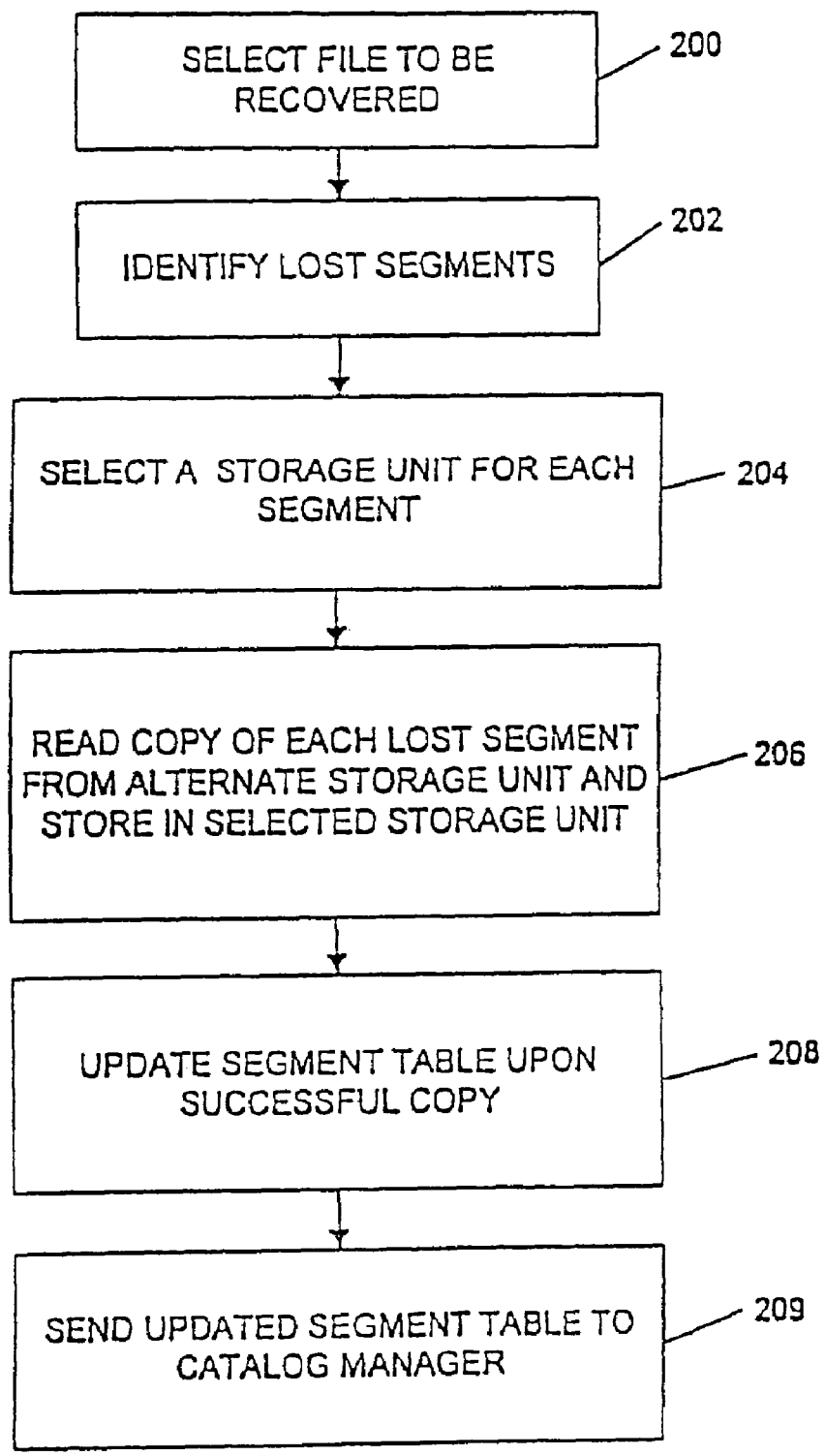
FIG. 5 is a flowchart describing how fault recovery may be performed when a storage unit becomes unavailable.

FIG. 5 is a flowchart describing in more detail how fault recovery may be performed when a storage unit becomes unavailable after its failure is detected. One way to detect such failure is described in more detail below in connection with FIGS. 10-12. Repeated failures to respond to requests also may be used to indicate failures. The success of this process depends on the number of copies of each segment within the system. Given a number N of copies, then N−1 storage units may fail and the system still will operate without loss of data. After a storage unit fails, a new storage unit may be installed in its place, with lost data restored, or the lost data may be recreated and distributed over the remaining storage units.

Additional copies of data may be made by first selecting the data, e.g., a file or source to be recovered, in step 200. The file to be recovered may be selected by a priority ordering, and may be selected either automatically or manually. This kind of recovery allows data from some files to be reconstructed and made available before data from other files is recovered. The lost segments of the data, i.e., those stored on the lost storage unit, are identified in step 202 using the segment table for the source. A new storage unit for each lost segment is selected in step 204, typically in the same manner as when data is originally captured, when a new storage unit is not available to replace the failed storage unit. Alternatively, the replacement storage unit is selected. A copy of the lost segment is read from an alternate storage unit in step 206 and stored in the selected storage unit. The file operations for steps 204 through 208 may be asynchronous and performed by separate threads for each segment. Such operation takes advantage of the many-to-many read/write capability provided in this network architecture. The segment table for the file then is updated upon the successful completion of the copy operation in step 208. When the process is complete, the catalog manager may be updated with the new segment table in step 209, if a catalog manager maintains the segment tables. If the original segment table was represented by a seed to a pseudorandom sequence generator, the actual table may need to be created and modified.

The speed of repopulation and redundancy restoration for an unloaded system using this $$\frac{s}{(n-1+d)(b/2)},$$

process is defined by the following equation:

where: s=size of lost files in megabytes (MB),
n=initial number of storage units,
b=average bandwidth of storage units, expressed in MB/second, and
d=user demand load, expressed in MB/second.

For example, if access to 50 gigabytes of storage is lost because one of ten storage units fails, then with n=10 storage units, with unit bandwidth b=10 MB/sec., then (n−1)=9 and (b/2)=5. Thus, recovery would take approximately 20 minutes with no other loads. This absolute recovery speed generally is reduced as a reciprocal of the varying playback load to clients, e.g., a 50% load results in 200% increase in repopulation time. When invoked, the redistribution task can run at a very fast rate with multiple storage unit checkerboard switched to multiple storage units, but repopulation activities operate opportunistically, subordinated to client file service requests. The net effect is only a slight loss of total bandwidth of the storage units due to the failed storage unit. Prioritization of the file selection for recovery ensures that the most important files are recovered most quickly.

Figure 6:
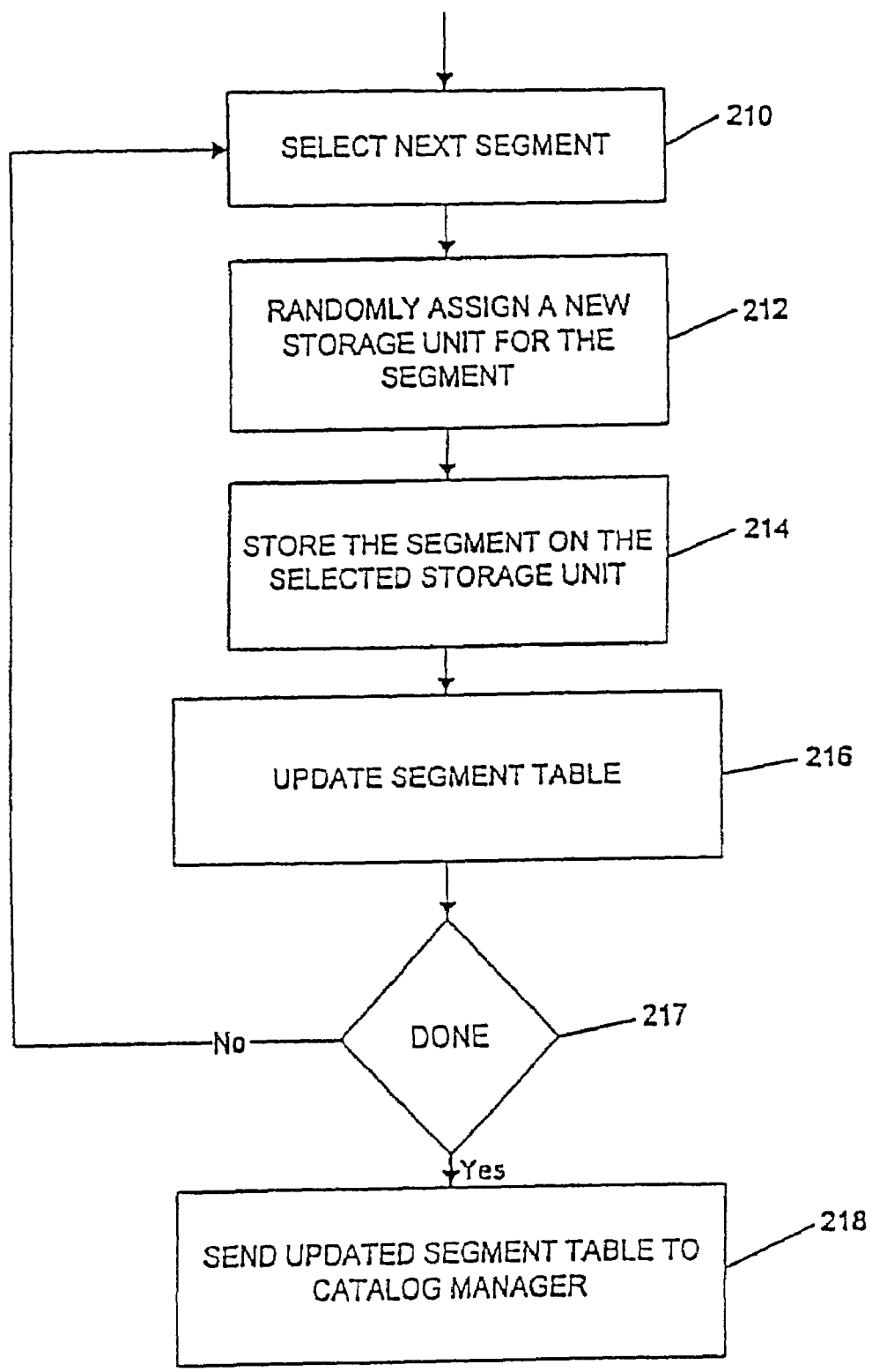
FIG. 6 is a flowchart describing how an additional copy of data may be made.

FIG. 6 is a flowchart describing in more detail how an additional copy of data may be made. This process may be invoked to make additional data copies available of mission critical or high-demand data. A date-stamp may be given to the new copy to indicate when the copy may be deleted. Given selected data, a segment of the data is selected in step 210. Each segment is assigned randomly a new storage unit in step 212, ensuring that each storage unit has at most one copy of a given segment. Next, the segment is stored on the selected storage unit in step 214. Upon successful completion of the storage of that segment, the segment table for the data is updated in step 216. If all of the segments of the data have not yet been copied, as determined in step 217, the process repeats by returning to step 210 to select the next segment of the data. When the process is complete, the catalog manager may be updated with the new segment table in step 218, if the catalog manager maintains the segment tables. While this process is sequential over the segments, each segment may be processed using a separate thread, and the file operation of step 214 may be asynchronous. Such processing enables the copy to be made very quickly. With this procedure, the segment table still may be represented using the seed for the pseudorandom number generator.

Figure 7:
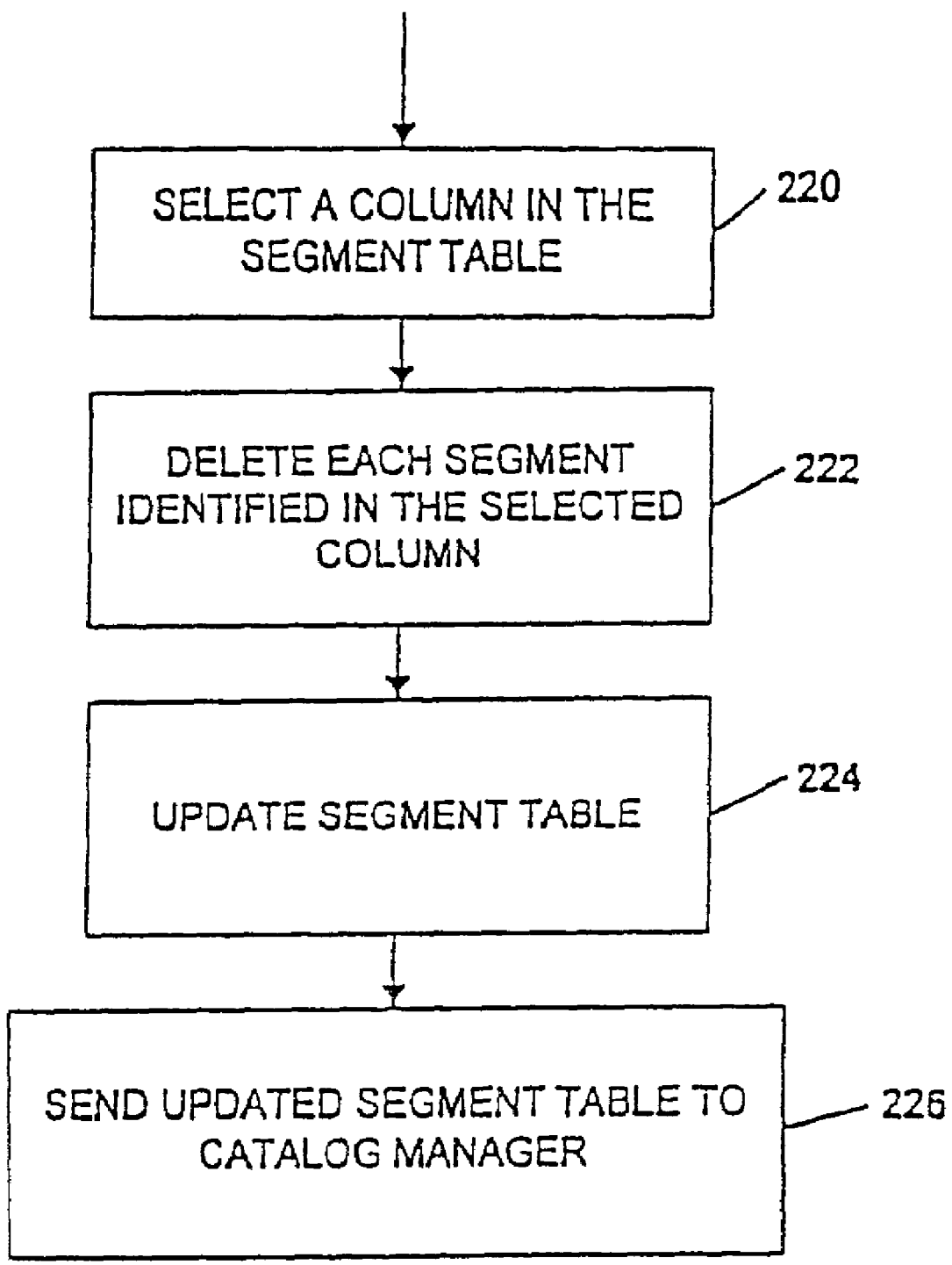
FIG. 7 is a flowchart describing how a copy of data may be deleted.

FIG. 7 is a flowchart describing in more detail how a copy of data is deleted. This process may be invoked, for example, when data is no longer in high demand. For example, a date stamp on a copy may be used to indicate when the data should be deleted. Given the segment table shown in FIG. 2 for given data, one of the sets of copies, i.e., a column in the table, is selected in step 220. Each segment in the column is deleted in step 222. Upon successful completion of the delete operation in step 222 for each segment, the segment table is updated in step 224. Steps 222 and 224 are repeated for segment. This process may be sequential over the segments or each segment may be processed by a separate thread. When the process is complete, the catalog manager may be updated with the new segment table in step 226, if the catalog manager maintains the segments tables.

Figure 8:
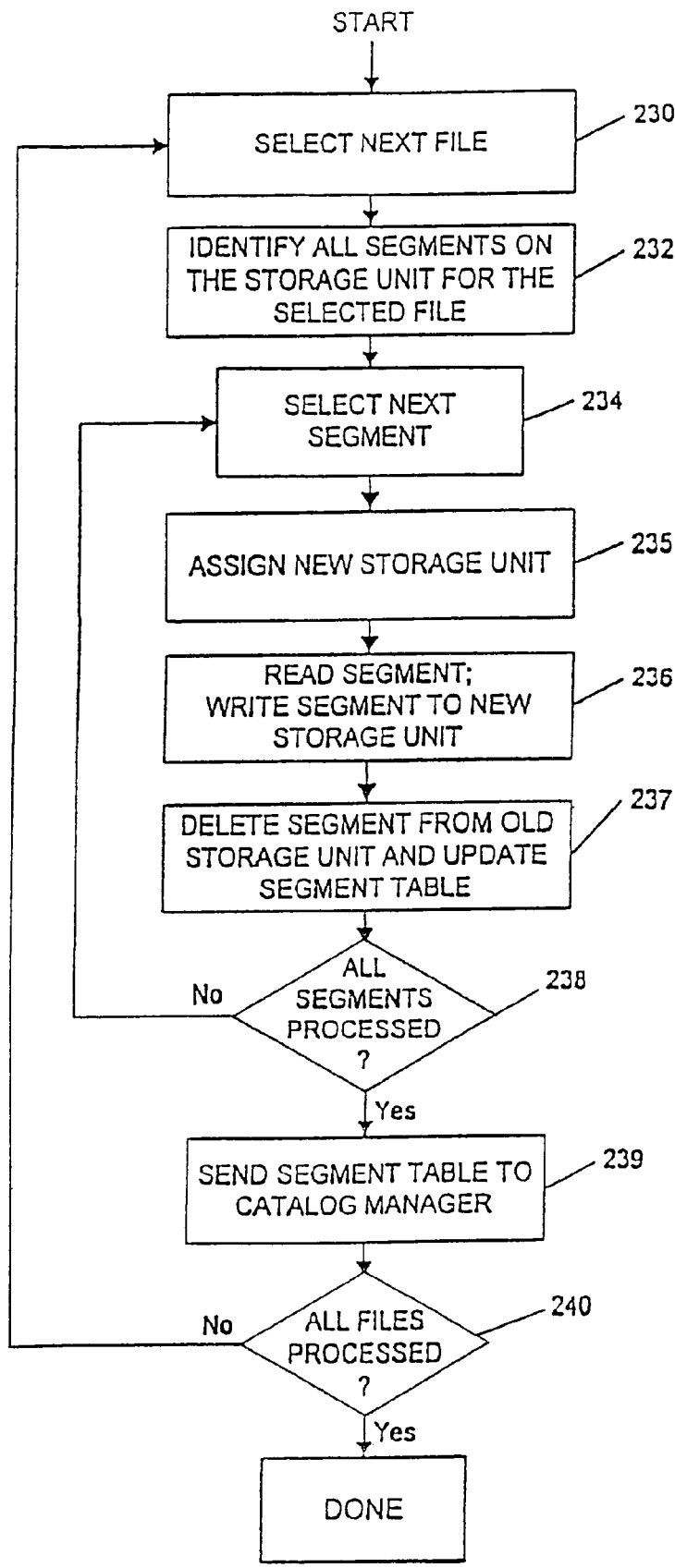
FIG. 8 is a flowchart describing how a storage unit may be removed from the system.

FIG. 8 is a flowchart describing how an otherwise active storage unit may be removed from the system. The data available on the storage unit is identified, for example by identifying a list of its files using its file system. First, the storage unit is made unavailable for writing new segments. This step may be accomplished, for example, by notifying the catalog manager or by sending a broadcast message to all clients. The segments of each file are redistributed on the other storage units before the storage unit is removed from the system. Given this list of files, the next file to be processed is selected in step 230. Using the segment table, all segments of this file on the storage unit are identified in step 232. The next segment to be processed is selected in step 234. The selected segment is assigned a new storage unit in step 235 by a random selection from the remaining storage units, assuring that no storage unit has more than one copy of a given segment. The data is then written to the newly selected storage unit in step 236. Upon successful completion of that write operation, the segment table is updated. When all the segments for a given file are redistributed, as determined in step 238, the segment table may be sent to the catalog manager if appropriate in step 239. The segments may be processed sequentially or by separate threads using asynchronous file operations. The segments may be deleted from the old storage unit after the catalog manager is updated. Processing continues with the next file, if any, as determined in step 240. If all files have been redistributed, this process is complete and the storage unit may be removed from the system.

Figure 9:
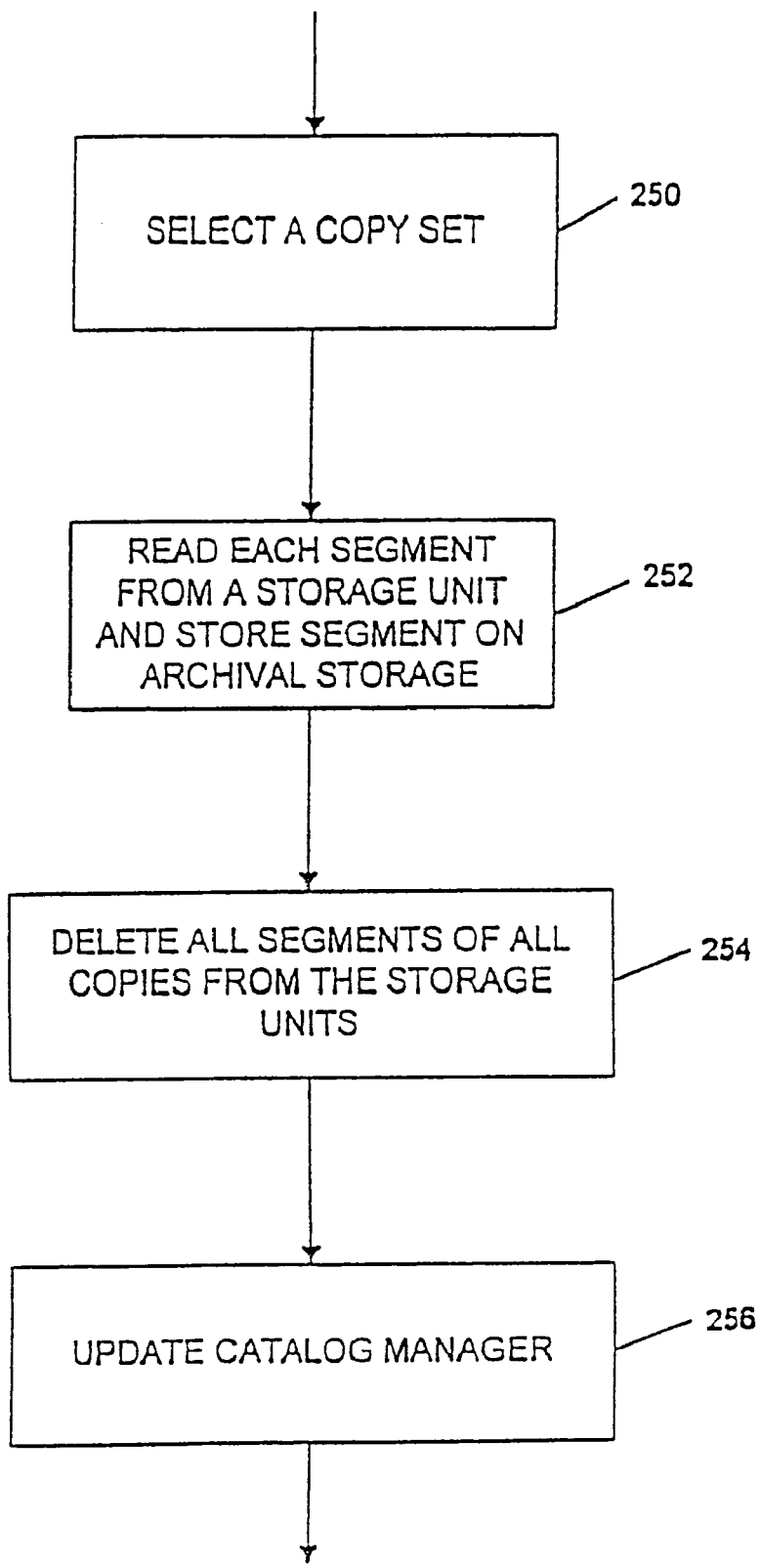
FIG. 9 is a flowchart describing how data may be archived or copied as a backup.

FIG. 9 is a flowchart describing how data may be archived or copied for backup. This process involves copying of one copy of each segment of the data from the available storage units into a backup storage system, such as an archival storage medium. In addition, each copy set may be deleted from all storage units. This process may be performed by selecting a copy set, e.g., the A list, from a column of the segment table in step 250. Alternatively, each segment may be read in order and the selection of a storage unit for each segment may be performed using techniques applied by other applications as described above. Each segment from the selected copy set is read from its storage unit and is stored on a storage medium in step 252. Upon successful copying of each segment to the storage medium, all of the remaining segments from all the remaining copy sets may be deleted from the storage units in step 254. The segments may be processed sequentially or by separate threads using asynchronous file operations. The catalog manager then may be updated in step 256.

Figure 10:
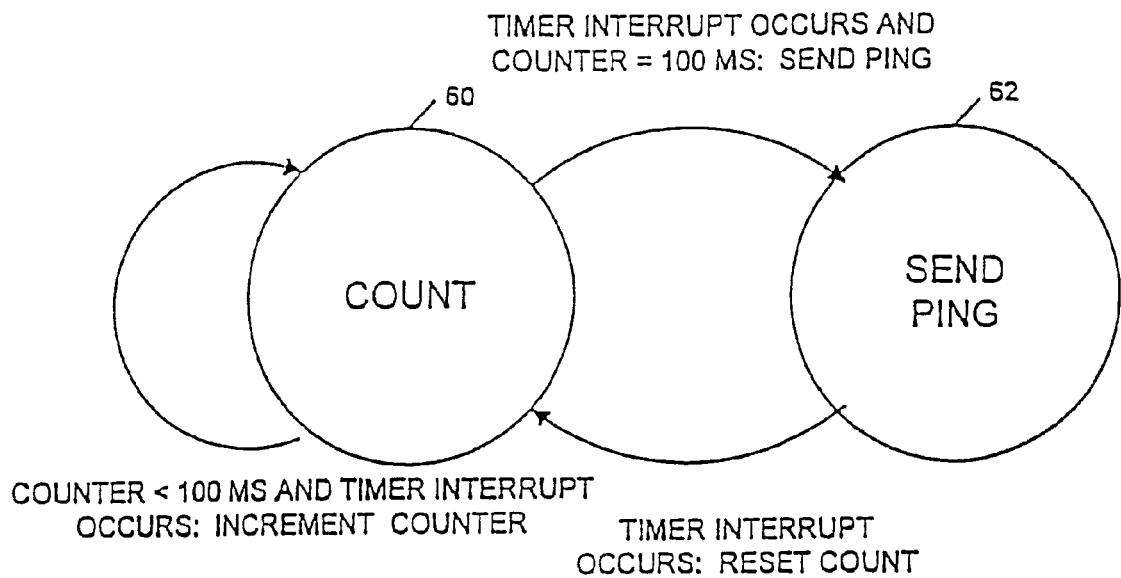
FIG. 10 is state diagram of a process on a storage unit for notifying a catalog manager of availability of the storage unit.
Figure 11:
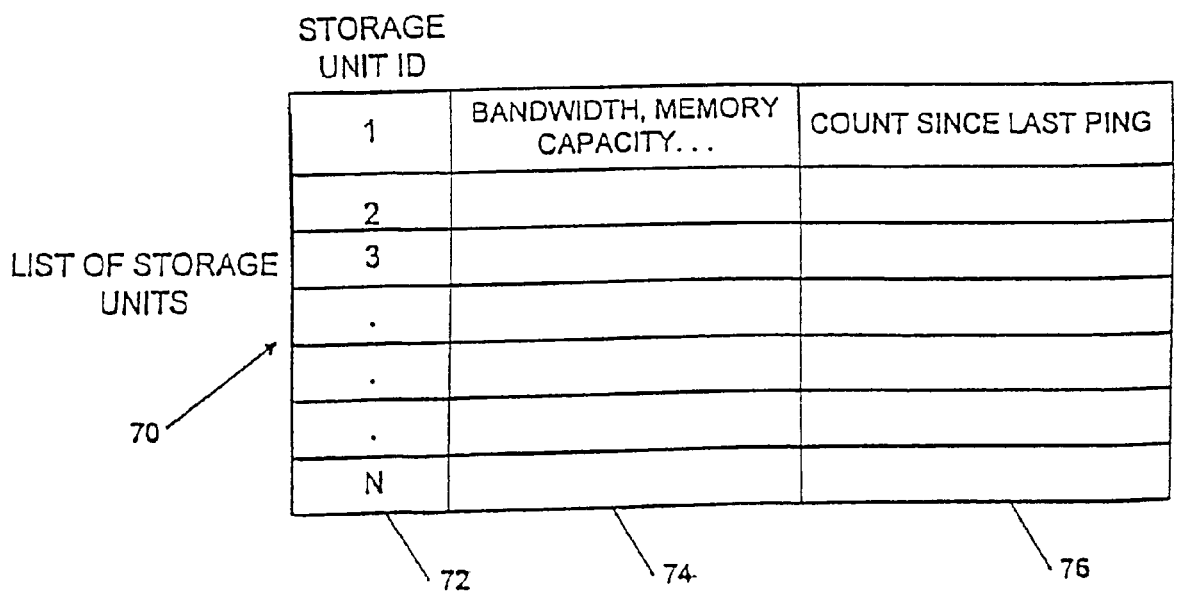
FIG. 11 illustrates a list of storage units that may be maintained by a catalog manager.
Figures 12, 13:
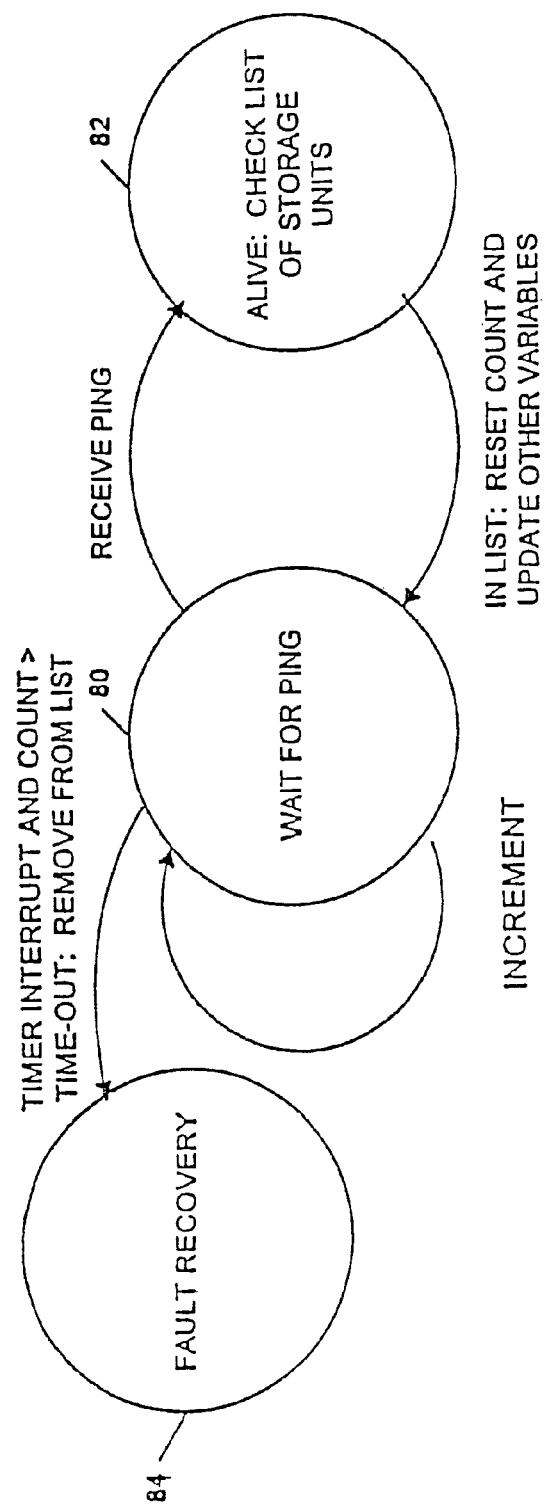
FIG. 12 is a state diagram illustrating how the catalog manager may monitor a storage unit.
FIG. 13 illustrates a table for tracking equivalency of media data files.

How the storage units may be monitored to determine availability and to detect failures will now be described in connection with FIGS. 10 through 12. There are several ways to determine whether storage units are available, including polling the storage units, handling exceptions from the storage units, or by the storage units periodically informing an application or applications of their availability. In one embodiment of the invention, in addition to maintaining a catalog of segment tables for each file, the catalog manager 49 or some other client may monitor which storage units 42 are active in the system. One method for monitoring the storage units is shown in FIGS. 10-12. Each storage unit available on the system establishes a process which periodically informs the catalog manager that it is available. In particular, this process may be considered as a state machine having a first state 60 in which the storage unit periodically increments a counter, for example, in response to a timer interrupt or event from a system timer. When this counter reaches a certain predetermined amount, such as a hundred milliseconds, a transition to another state 62 occurs. In the transition to state 62, a signal, called a Aping,≅ is sent to the catalog manager by the storage unit. This signal may be a small message, even one ATM cell, that does not require much bandwidth to transmit. This signal may include an identifier of the storage unit, and possibly other information such as the capacity, efficiency and/or bandwidth availability of the storage unit. At the next timer interrupt or event, the counter is reset and a transition back to state 60 occurs.

The catalog manager may keep track of the available storage units. For this purpose, the catalog manager may use a list 70 of storage units, an example of which is shown in FIG. 11. This list of storage units may be implemented as a table indexed by the identifiers of the storage units as indicated at 72. If the storage unit is present or available, the bandwidth, memory capacity or other information about the power of the storage unit is made available in column 74. The count since the last Aping≅ from the storage unit also is present as indicated in column 76. If this count exceeds a predetermined amount, such as three hundred milliseconds, the storage unit is considered to be out of service and fault recovery procedures, such as described above, may be followed. An example tracking process which maintains the list 70 of storage units will now be described in more detail in connection with FIG. 12.

FIG. 12 is a state machine describing a tracking process which may be performed by the catalog manager to determine which storage units are available. One of these state machines may be established for each storage unit as a process on the catalog manager. The first state 80 is a waiting state in which the count value 76 for the storage unit in the list 70 of storage units is incremented for the storage unit in response to periodic timer interrupts. When a Aping≅ is received from the storage unit, the transition occurs to state 82. In state 82, the presence of this storage unit in list 70 is verified. If the storage unit is in the list 70, the count 76 for the storage unit is reset, other information about the storage unit may be updated, and a transition back to state 80 occurs. If the storage unit is not in the list, it is added to the list with a reset count and a transition back to state 80 occurs. After a given increment, if the count for the storage unit is greater than a predetermined time out value, such as three hundred milliseconds, fault recovery procedures are performed. In particular, the storage unit is removed from list 70 and fault tolerant procedures are performed in state 84. If a Aping≅ from a storage unit is received by the catalog manager and if that storage unit does not have a corresponding tracking process, then the catalog manager adds the storage unit to the list and creates a tracking process for the storage unit.

In addition to having a catalog manager 49, the system also may include a database, called an asset manager, which stores a variety of data about the media sources available in the system such as an index for each file. The catalog manager and asset manager also may be combined. One useful kind of information for storing in the asset manager is a table, shown in FIG. 13, that relates equivalent data files based on a source identifier and a range within that source, such as shown in U.S. Pat. No. 5,267,351. The source identifier is an indication of the original source of data, which may be an analog source, whereas the data actually available is a digitized copy of that source stored on the storage units. In particular, the table has an entry for a source identifier 100, a range within the source identifier 102, and an indication 104, such as list of data files, of equivalent data from that source. The list 104 may be used to identify one of the data files for a source, and in turn access the segment table for that file to determine where segments of the data are distributed on the various storage units. The segment table 90 of FIG. 2 may be incorporated into this list 104 of FIG. 13 as shown at 106 and 108. Such equivalency among data also may be maintained by any application program.

Since the catalog manager is a database that monitors how data is distributed on the various storage units, it also should be designed to enhance fault tolerance and availability and to reduce its likelihood of being a bottleneck. Accordingly, the catalog manager should be implemented using conventional distributed database management techniques. Also, highly available machines, such as those from Marathon Technologies, Tandem Computers, Stratus, and Texas Micro, Inc., may be used to implement the catalog manager. There also may be several catalog managers that are used by separate client applications. Alternatively, each client application may maintain its own copy of catalogs locally, using standard techniques to maintain consistency between multiple copies of the data. In this manner, a catalog manager is not a central point of failure. A client also may act as its own catalog manager. The catalogs also may be treated as data of which copies of its segments are randomly distributed among the storage units. Each client may have a segment table, or random number generator seed representing the segment table, for each catalog.

Having now described how data may be captured and stored onto storage units, and how the storage of data on the storage units may be managed, client applications that perform authoring and playback will now be described in more detail in connection with FIGS. 14 and 15.

There are several kinds of systems that may be used to author, process and display multimedia data. These systems can be used to modify the data, define different combinations of data, create new data and display data to a user. A variety of techniques are known in the art for implementing these kinds of systems.

Multimedia authoring, processing and playback systems typically have a data structure which represents the multimedia composition. The data structure ultimately refers to clips of source material, such as digitized video or audio, using an identifier of the source material, such as a unique identifier or a file name, and possibly a temporal range within the source material defining the clip. The identifier may be of a type that can be used with a list of equivalent data files to identify a file name for the source material. An index may be used to translate the temporal range in the source into a range of bytes within a corresponding file. This range of bytes may be used with the segment table for the file to identify segments of data that are needed and the storage units from which the data will be retrieved.

Figure 14:
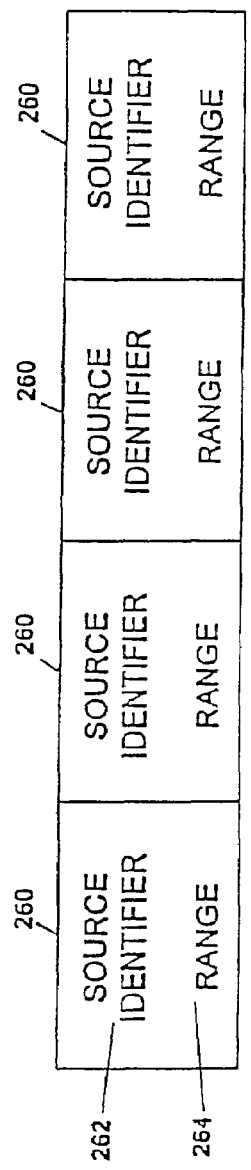
FIG. 14 illustrates a list structure for representing a motion video sequence of several clips.
Figure 15:
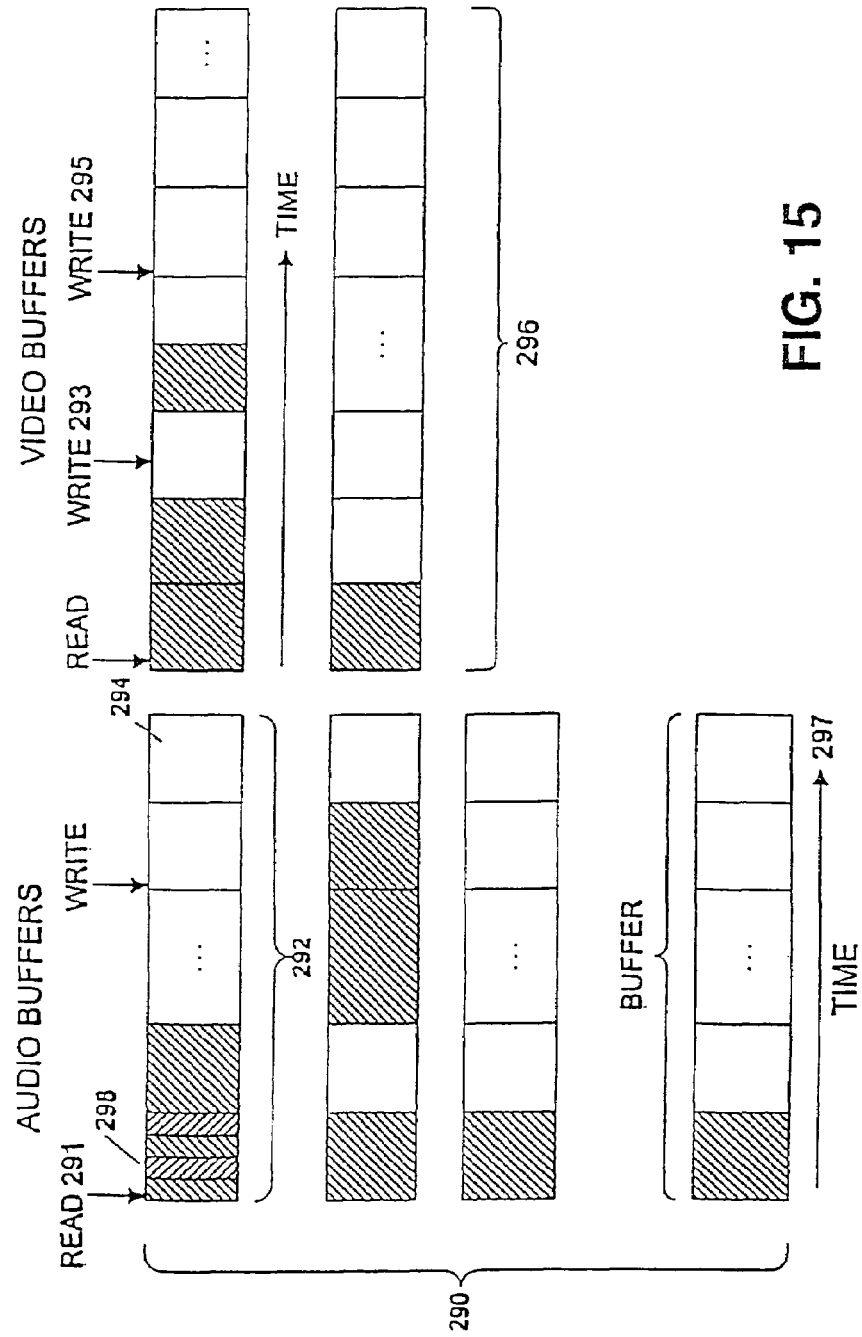
FIG. 15 illustrates a structure of buffer memories for supporting playback of two streams of motion video data and four streams of associated audio data at a client.

FIG. 14 shows an example list structure that may be used to represent part of a multimedia composition. In an example shown in FIG. 14, there are several clips 260, each of which includes a reference to a source identifier, indicated at 262, and a range within the source, as indicated at 264. Generally, there may be such a list for each track of media in a temporal composition. There are a variety of data structures which may be used to represent a composition. In addition to a list structure, a more complex structure is shown in PCT Published Application WO93/21636 published on Oct. 28, 1993. Other example representations of multimedia compositions include those defined by Open Media Framework Interchange Specification from Avid Technology, Inc., QuickTime from Apple Computer, DirectShow from Microsoft, and Bento also from Apple Computer, and as shown in PCT Publication WO96/26600.

The data structure described above and used to represent multimedia programs may use multiple types of data that are synchronized and displayed. The most common example is a television program or film production which includes motion video (often two or more streams) with associated audio (often four or more streams). As shown in FIG. 15, the client computer may have a corresponding set 290 of memory buffers 294 allocated in the main memory. Each buffer may be implemented as a Aserializing= buffer. In other words, the client inserts data received from a storage unit into these independently accessible portions and reads from the set of buffers sequentially. Since requests may be sent to several storage units and data may be received at different times for the same stream, the buffers may not be filled in sequence when written, but are read out in sequence to be displayed. In FIG. 15, the filled in buffers indicate the presence of data in the buffer. Any empty buffer may be filled at any time as indicated at 293 and 295. However, each set of buffers has a current read location 291 from which data is read and which advances as time progress as indicated in 297. A subset 292, 296 of these buffers may be allocated to each stream of data.

Each buffer in the set of buffers has a size that corresponds to a fixed number of segments of data, where the segment size is the size of file segments stored on the storage units. There may be several, e.g., four, audio buffers per stream 292 of audio data, where each buffer can contain several, e.g., four, segments. Similarly, each video stream 296 may have several, e.g., four, buffers each of which contains several, e.g., four, segments. Each of the buffers may be divided into independently accessible portions 298 that correspond in size to the size of data packets for which transfer is scheduled over the network.

Because the video and audio data may be stored in different data files and may be combined arbitrarily, better performance may be obtained if requests for data for these different streams on the client side are managed efficiently. For example, the client application may identify a stream for which data can be read, and then may determine an amount of data which should be read, if any. A process for performing this kind of management of read operations is shown in U.S. Pat. No. 5,045,940 In general, the client determines which stream has the least amount of data available for display. If there is a sufficient amount of buffer space in the set of buffers for that stream to efficiently read an amount of data, then that data is requested. It is generally efficient to read data when the available space in memory for the selected stream is large enough to hold one network transmission unit of data. In the present invention, when it is determined that data for a stream should be requested, each segment of the data is requested from a storage unit selected from those on which the segment is stored.

Figure 16:
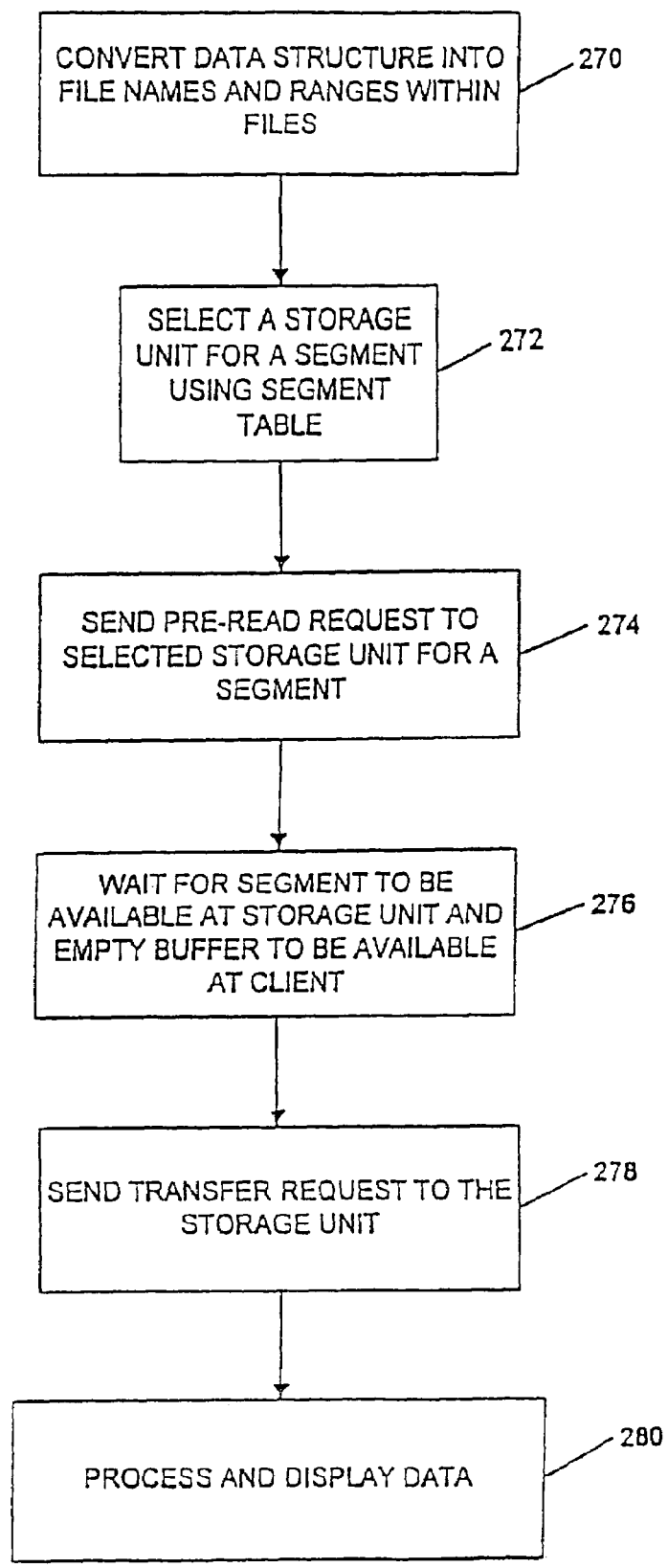
FIG. 16 is a flowchart describing how a client may process a multimedia composition into requests for data from a selected storage unit.

A general overview of a process by which a composition may be converted into requests for data in order to display the data will now be described in connection with FIG. 16. In order to know what files to request from the storage unit, an application program executed on the client system may convert a data structure representing a composition, such as shown in FIG. 14, into file names and ranges within those files in step 270 in FIG. 16. For example, for each source identifier and range within that source, a request may be sent to the asset manager. In response, the asset manager may return a file name for a file containing equivalent media corresponding to the received source identifier and range. The segment table for the file and the list of available storage units also may be catalog manager.

When the client requests a segment of data for a particular data stream, the client selects a storage unit, in step 272, for the segment that is requested. This selection, in one embodiment, will be described in more detail below in connection with FIGS. 17 and 18. In general, the storage unit with the shortest queue 48 (FIG. 1) is selected. The client then reads the data from the selected storage unit for the segment, in steps 274 through 278. Step 274 may be understood as a pre-read step in which the client sends a request to a storage unit to read desired data from nonvolatile storage into faster, typically volatile storage. The request to the storage unit may include an indication of how much time is required from the time the request is made until that requested data must be received at the client, i.e., a due time. After a pre-read request is accepted, the client waits in step 276. The request is placed in the storage unit=s queue 48, and the due time may be used to prioritize requests as described below. Data is transferred from the storage unit in step 278 after data becomes available in a buffer at the storage unit. This step may involve scheduling of the network usage to transfer the data to maximize efficiency of network utilization. The received data is stored in the appropriate buffer at the client, and ultimately is processed and displayed in step 280.

There are several ways to initiate the pre-read requests, including selection of a storage unit, in step 274 and the data transfer in step 278. For example, the MediaComposer authoring system from Avid Technology, Inc., of Tewksbury, Mass., allows a user to set either a number of clips or an amount of time as a look-ahead value, indicating how far ahead in a composition the application should initiate read requests for data. A program schedule for a television broadcast facility also may be used for this purpose. Such information may be used to initiate selection of a storage unit and pre-read requests. Such pre-reads may be performed even if buffer space is not available in buffers 290 (FIG. 15), as is shown in European patent application 0674414A2, published Sep. 9, 1995. The amount of available space in the buffers 290 (FIG. 15) may be used to initiate data transfers in step 278 (FIG. 16), or to initiate both pre-reads (step 274) and data transfers (step 278).

Figure 17:
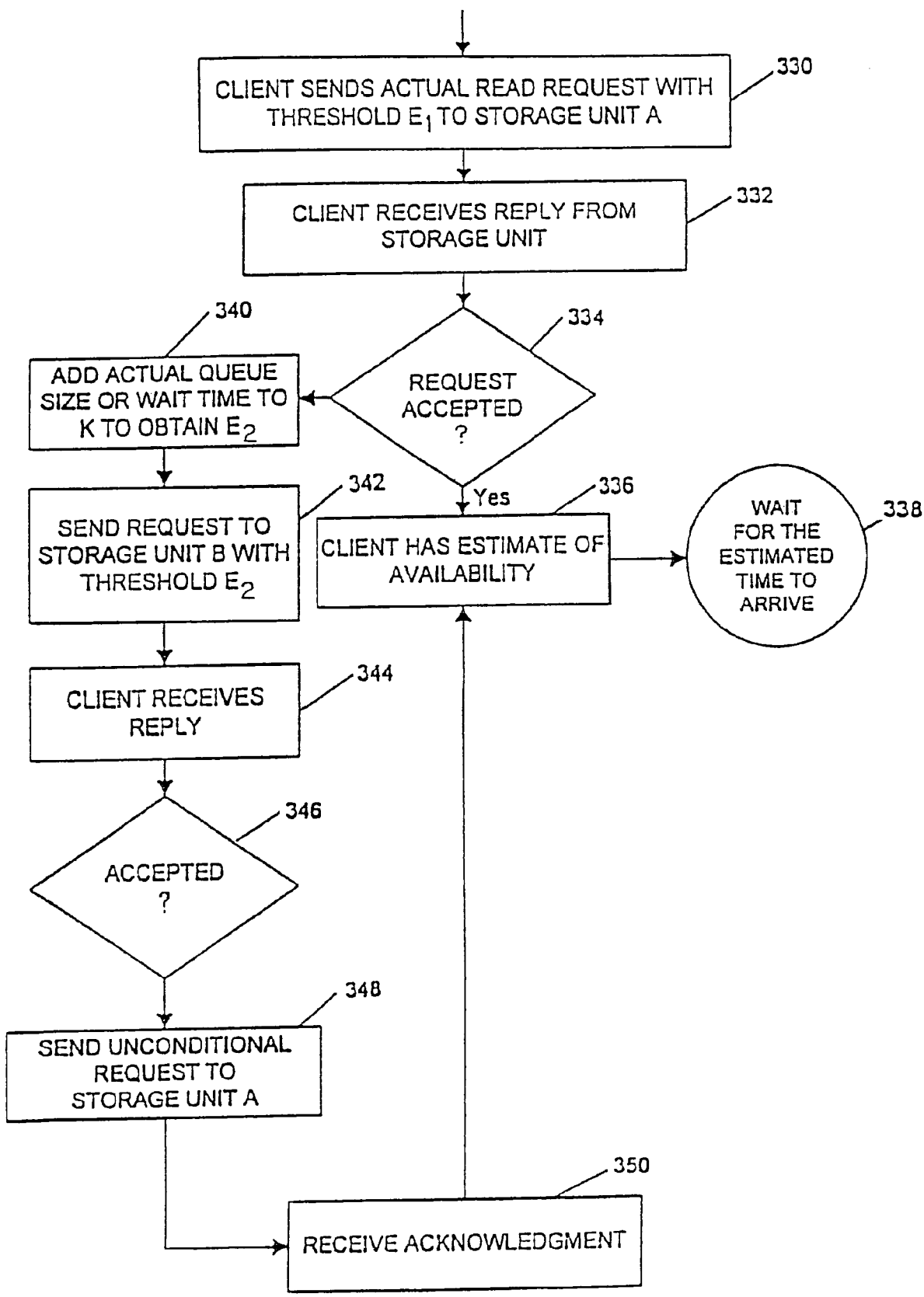
FIG. 17 is a flowchart describing how a client requests a storage unit to transfer data from primary storage into a buffer in one embodiment.
Figure 18:
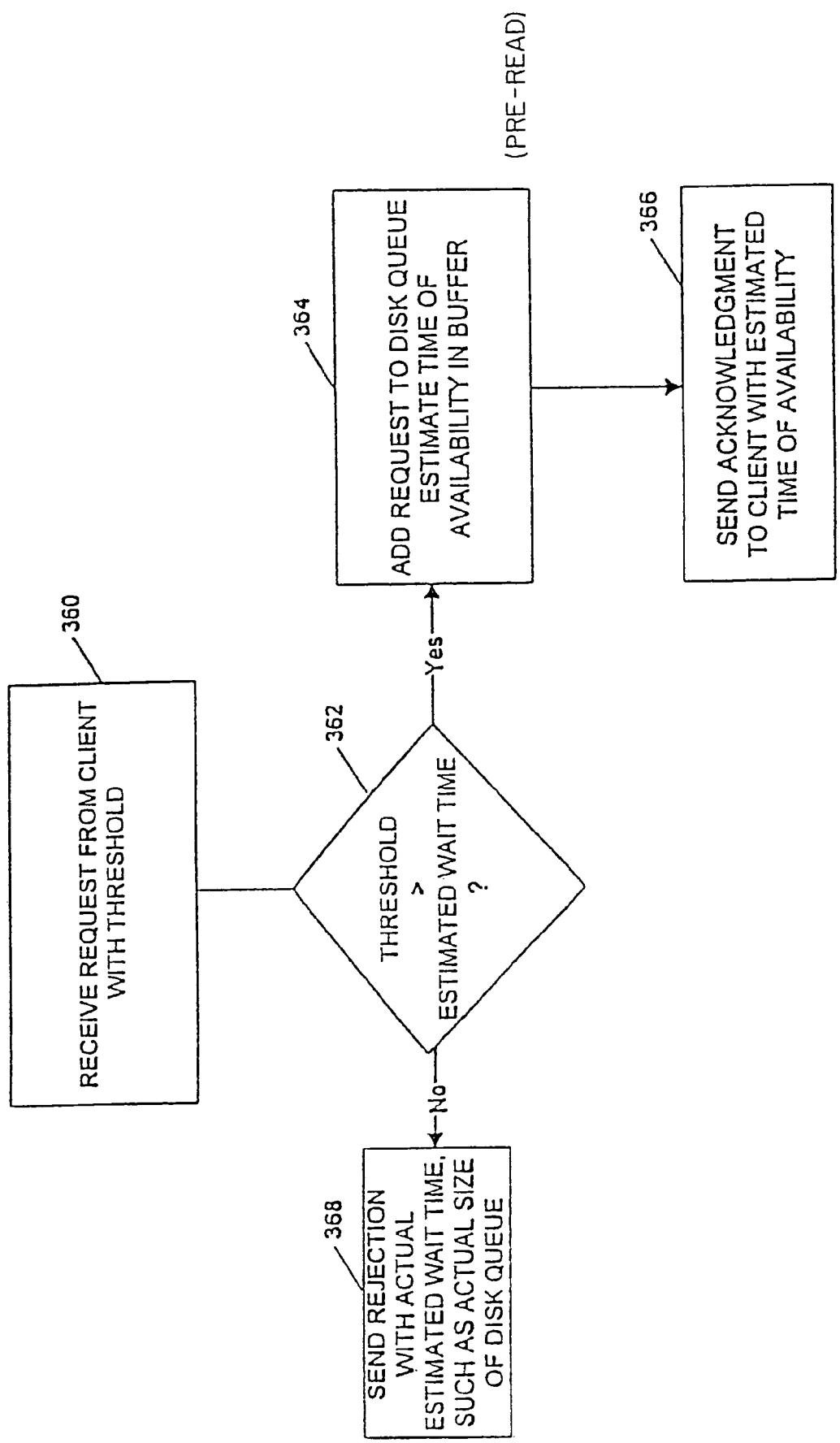
FIG. 18 is a flowchart describing how a storage unit replies to requests from a client in FIG. 17.

One process which enables a client to make an adequate estimate of which storage unit has the shortest queue of requests, without requiring an exhaustive search of all the available storage units, will now be described in connection with FIGS. 17 and 18. First, the client sends a request with a threshold E1 to a first storage unit in step 330. The threshold E1 is a value indicating an estimate of time by which the request should be serviced. This estimate may be expressed as a time value, a number of requests in the disk queue of the storage unit, such as four, or other measure. The meaning of this threshold is that the request should be accepted by the storage unit if the storage unit can service the request within the specified time limit, for example. The client receives a reply from the storage unit in step 332. The reply indicates whether the request was accepted and placed in the disk queue of the storage unit or whether the request was rejected as determined in step 334. If the request is accepted, the client is given an estimate of time at which the data will be available in a buffer at the storage unit in step 336. For example, if the data for the requested segment already is in a buffer, the storage unit indicates that the data is immediately available. The client then may wait until it is time to request transfer of the data (step 278 in FIG. 16) some time after the estimated time has passed. If the request is rejected, an estimate of the amount of time the storage unit actually is likely to take, such as the actual size in number of entries of the disk queue, is returned from the storage unit. This actual estimate is added to a value K to obtain a threshold E2 in step 340. The value K may be two, if representing a number of disk queue entries. Threshold E1 and value K may be user-definable. A request is sent to a second storage unit in step 342 indicating the threshold E2. The client then receives a reply in step 344, similar to the reply received in step 332. If this reply indicates that the request was accepted, as determined in 346, the client has an estimate of time at which the data will be available at the second storage unit, as indicated in step 336 after which the client may wait to schedule the data transfer. Otherwise, an unconditional request, one with a very large threshold, is sent to the first storage unit in step 348. An acknowledgment then is received in step 350 indicating the estimate of time at which the data will be available in a buffer at the storage unit, as indicated at step 336.

The storage unit, on the other hand, does not know whether it is the first or second storage unit selected by the client when it receives a request. Rather, the storage unit simply receives requests as indicated in step 360. The threshold indicated in the request is compared to the storage unit=s own estimate of the time the client will need to wait in step 362, for example by comparing the size of the disk queue of the storage unit to the specified threshold. If the threshold in the request is greater than the estimate made by storage unit, the request is placed in the disk queue and an estimate of the time when the data will be available in a buffer at the storage unit is determined in step 364. This estimate may be determined, for example, based on disk access speed, disk queue length and possibly a running average of recent performance. An acknowledgment is sent to the client in step 336 including the estimated time of availability of the data in the buffer at the storage unit. Otherwise, a rejection is sent in step 368 indicating this estimate, such as the actual size of the disk queue.

The storage unit may keep track of which segments are in which buffers on the storage unit. Segment data may be read from the storage medium into any free buffer or into a buffer occupied by the least recently used segment. In this manner, data for a segment may be immediately available in a buffer if that segment is requested a second time.

As an alternative, a client may use another method to select a storage unit from which data will be retrieved, as discussed below. After sending the request, the client may receive an acknowledgment from the storage unit indicating that the request is in the disk queue at the storage unit. Instead of receiving an estimate of time at which the data will be available in a buffer at the storage unit, the client may wait until a ready signal is received indicating that the storage unit has read the requested data into a specified buffer memory at the storage unit. During this waiting period, the client may be performing other tasks, such as issuing requests for other data segments, displaying data or processing data. One problem with this alternative is that the client accepts an unsolicited message, i.e., the ready signal from the storage unit, in response to which the client changes context and processes the message. The client could be busy performing other operations. Although this process does provide a more accurate estimate of the time at which data is available in a buffer at the storage unit, the ability to change contexts and process incoming messages quickly involve more expensive hardware at the client.

There are several other ways a storage unit may be selected from the segment table for a file. For example, when a client is making a file read request, the client can pick randomly from either the "A" list or "B" list for the file in question. Alternatively, the client may review all of its currently outstanding requests, i.e., requests sent but not yet fulfilled, and pick which storage unit out of the storage units on the A and B lists for the segment currently has the fewest outstanding requests. This selection method may reduce the chance of a client competing with its own outstanding requests, and will tend to spread requests more evenly over all the storage units. Alternatively, rather than examining outstanding requests, a client may examine a history of its recent requests, e.g., the last "n" requests, and for the next request pick whichever storage unit from the A list and B list for the segment has been used less historically. This selection method tends to spread requests more evenly over all the storage units, and tends to avoid a concentration of requests at a particular storage unit. The client also may request from each storage unit a measure of the length of its disk queue. The client may issue the request to the storage unit with the shortest disk queue. As another possibility, the client may send requests to two storage units and ultimately receive the data from only one. Using this method on a local area network, the client may cancel the unused request. On a wide area network, the storage unit that is ultimately selected may cancel the unused request at the other storage unit.

As stated above, a storage unit will likely receive multiple requests from multiple applications. In order to manage the requests from multiple applications to ensure that the most critical requests are handled first, a queue 48 (FIG. 1) is maintained for each storage unit. The queue may be maintained in several parts, depending on the complexity of the system. In particular, the storage unit may maintain different queues for disk access and for network transfers. In addition, the queue may segregate requests from time-sensitive applications using data having specific due times, e.g., for playback to broadcast, from requests from other applications, such as capture systems, authoring tools or service and maintenance applications. Storage requests may be separated further from requests from authoring tools and requests from service and maintenance programs. Requests from authoring tools may be separated further from service and maintenance requests.

Figure 19:
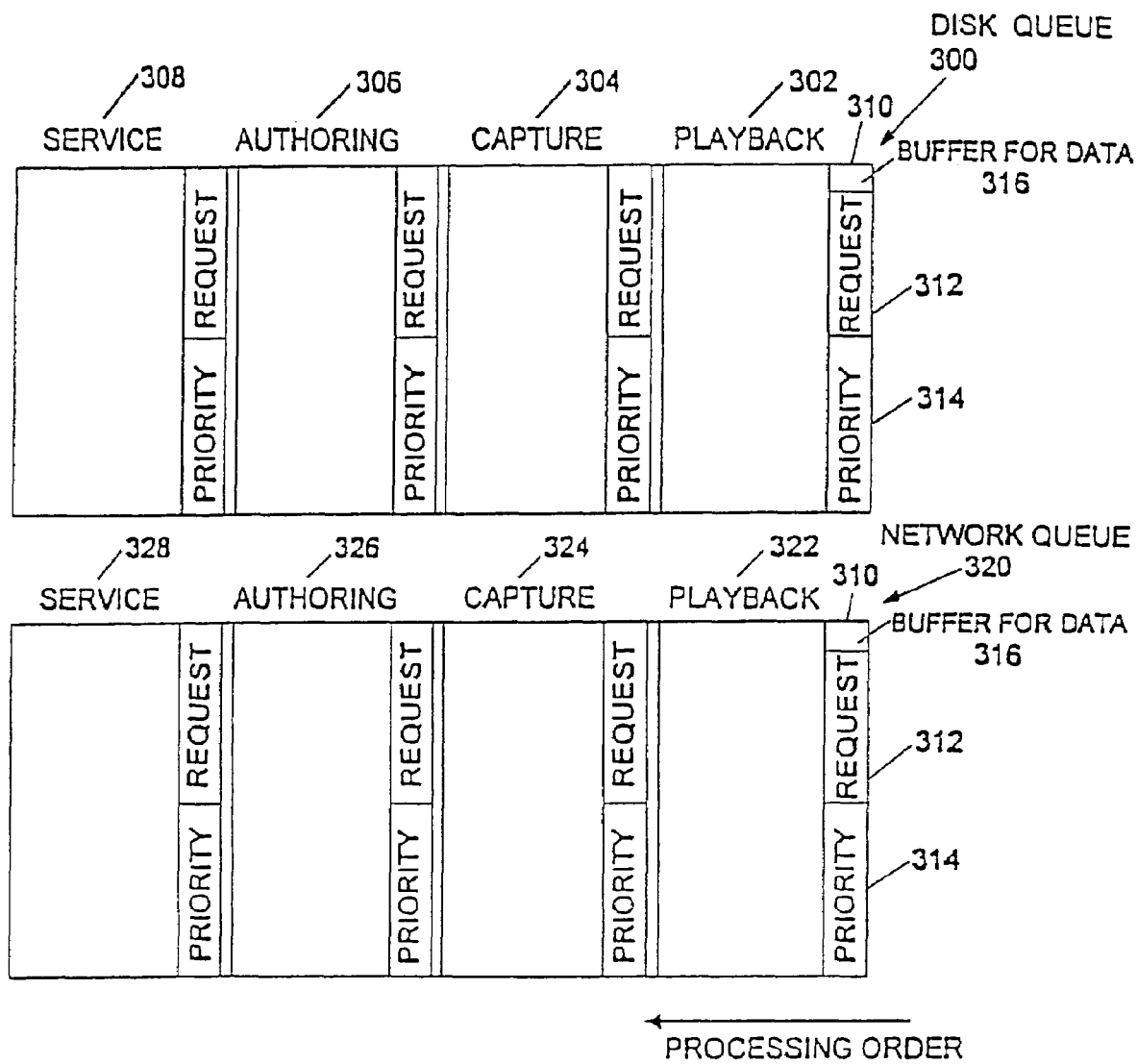
FIG. 19 illustrates example disk queues, for prioritizing requests for disk access to data, and network queues, for prioritizing requests for network transfers of data.

FIG. 19 illustrates one embodiment of queue 48, utilizing a disk queue 300 and a network queue 320. The disk queue has four subqueues 302, 304, 306 and 308, one for each of the playback, capture, authoring and service and maintenance client programs, respectively. Similarly, the network queue 320 has four subqueues 322, 324, 326 and 328. Each queue includes one or more entries 310, each of which comprises a request field 312 indicating the client making the request and the requested operation, a priority field 314 indicating the priority of the request, and a buffer field 316 indicating the buffer associated with the request. The indication of the priority of the request may be a deadline, a time stamp, an indication of an amount of memory available at the client, or an indication of an amount of data currently available at the client. A priority scheduling mechanism at the storage unit would dictate the kind of priority stamp to be used.

The priority value may be generated in many ways. The priority value for an authoring or playback system is generally a measure of time by which the application must receive the requested data. For example, for a read operation, the application can report how much data (in milliseconds or frames or bytes) it has available to play before it runs out of data. The priority indication for a capture system is generally a measure of time by which the client must transfer the data out of its buffers to the storage unit. For example, for a write operation, the application can report how much empty buffer space (in milliseconds, frames or bytes) it has available to fill before the buffer overflows. Using milliseconds as a unit of measure, the system may have an absolute time clock that could be used as the basis for ordering requests in the queue 48. In this case, all applications and storage units may be synchronized to the absolute time clock. If such synchronization is not practical, the application may use a time that is relative to the application that indicates how much time from the time the request is made that may pass until the requested data should be received by the client. Assuming low communication latency, the storage unit may convert this relative time to an absolute time that is consistent with the storage unit.

The storage unit processes the requests in its disk queues 302-308 in their priority order, i.e, operating on the requests in the highest priority queue first, in order by their priority value, then the requests in successively lower priority queues. For each request, the storage unit transfers data between the disk and the buffer indicated by the request. For a read request, after the request is processed, the request is transferred from the disk queue to the network queue. For a write request, the request is removed from the disk queue after the write operation completes successfully.

In an embodiment of the invention to be described in more detail below, the storage unit uses the network queue to prioritize network transfers in the process of scheduling those transfers. In this embodiment, clients request transfer of data over the network. If a storage unit receives two such requests at about the same time, the storage unit processes the request that has a higher priority in its network queue. For a read request, after the request is processed, the request is removed from the network queue. For a write request, the request is transferred from the network queue to the disk queue, with a priority depending on the availability of free buffers, after the transfer completes successfully. If the time has passed for a request in the network queue to be processed, the request may be dropped indicating that the client is no longer operating or did not request the network transfer in time.

Data transfers between the storage units and clients over the computer network may be scheduled to improve efficiency. In particular, scheduling data transfers improves bandwidth utilization of the computer network. Such scheduling of the network usage should be performed particularly if the bandwidth of the link between a client and a switch is on the same order of magnitude as the bandwidth of the link between the storage unit and the switch. In particular, if the storage unit sends data and the client receives data at the link speed of their respective network connections, data is not likely to accumulate at a network switch or to experience other significant delays.

In order to enforce such utilization of the network, a mechanism may be provided that forces each client to receive data from only one storage unit, and that forces each storage unit to send data to only one client, at any given time. For example, each client may have only one token. The client sends this token to only one storage unit to request transfer of the data for a selected segment. The token may indicate the deadline by which the data must be received by the client, i.e., the priority measure, and the specified segment. Each storage unit sends data to only one client at a time, from which it has received a token. The storage unit only accepts one token at a time. After the data is transferred, the storage unit also returns the token.

Another network scheduling process will now be described in connection with FIGS. 20 and 21. This process provides a similar result but does not use a token. Rather a client requests a communication channel with a storage unit, specifying a segment and an amount of time E3 that the client is willing to wait for the transfer to occur. The client also may specify a new due time for the segment by which the client must receive the data.

Figure 20:
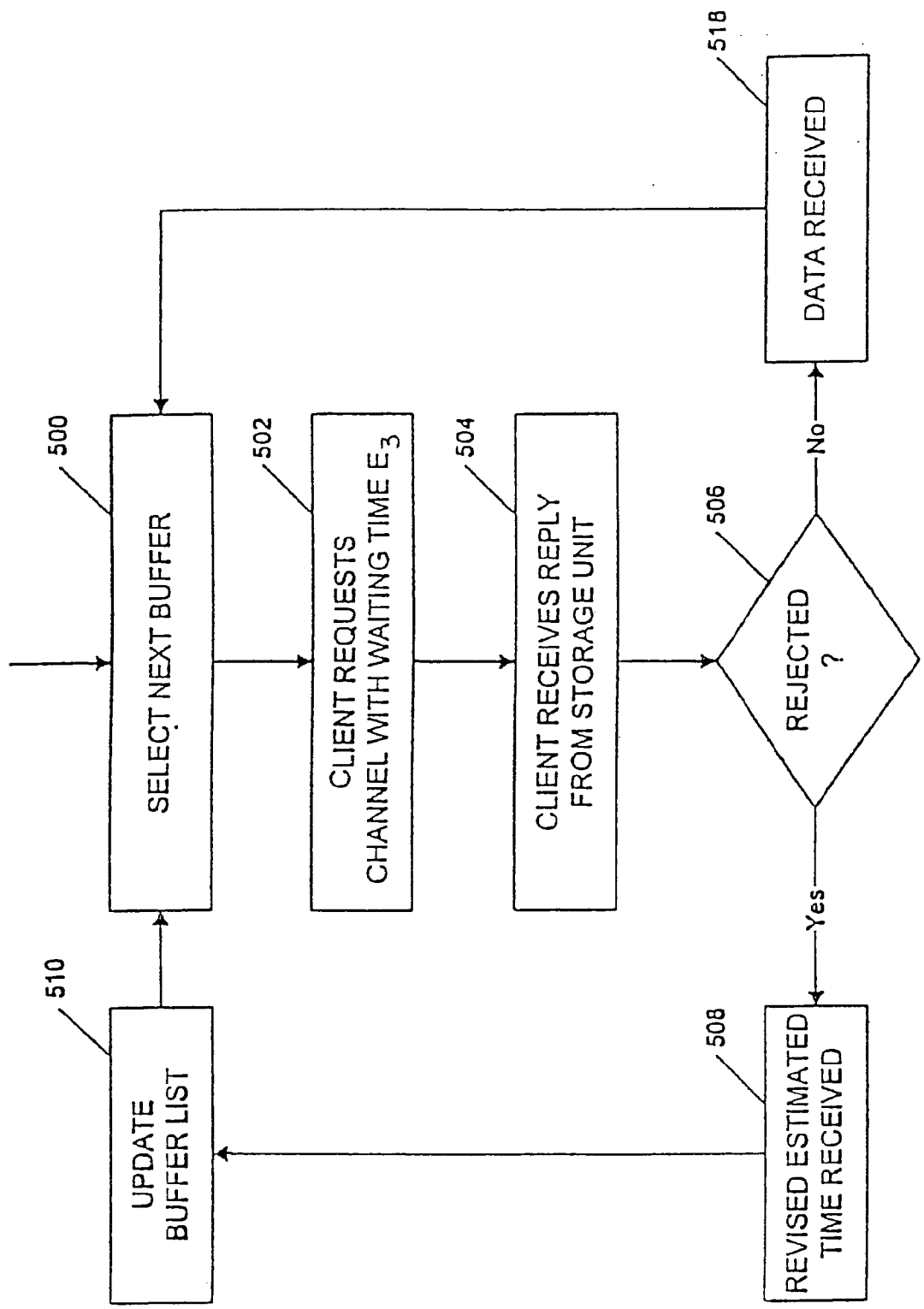
FIG. 20 is a flowchart describing how a client requests a storage unit to transfer data over the network in one embodiment.
Figure 21:
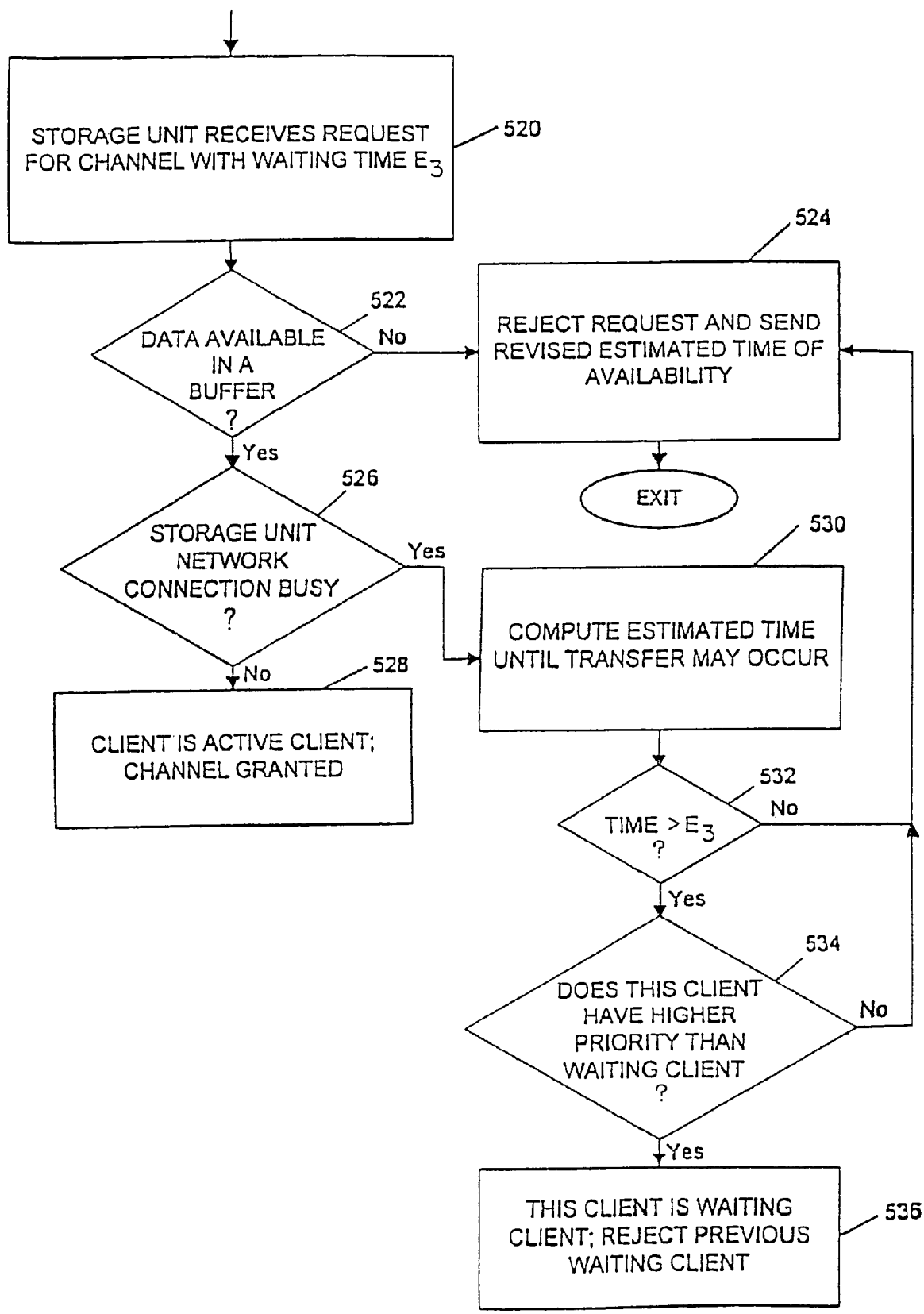
FIG. 21 is a flowchart describing how a storage unit processes requests to transfer data from multiple clients in one embodiment.

Referring now to FIG. 20, the client process for transferring data over the network will now be described. At any point in time during the playback of a composition, each buffer has a segment of data associated with it and a time by which the data must be available in the buffer for continuous playback. As is known in the art, the application associates each of the buffers with a segment during the playback process. As shown above in connection with FIGS. 17 and 18, each segment that a client has preread has an associated estimated time by which the data will be available at the storage unit. Accordingly, the client may order the buffers by their due time and whether the requested data is expected to be available in a buffer at the storage unit. This ordering may be used by the client to select a next buffer for which data will be transferred in step 500. The client requests a communication channel with the storage unit in step 502, specifying a waiting time E3. This value E3 may be short, e.g., 100 milliseconds, if the client does not need the data urgently and if the client may perform other operations more efficiently. This value E3 may be longer if the client needs the data urgently, for example, so that it does not run out of data for one of its buffers. In step 504, the client receives a reply from the storage unit. If the storage unit indicates that the request is rejected, as determined in step 506, a revised estimated time is received with the message in step 508. This revised estimated time may be used to update the buffer list in step 510 from which buffers are selected. Processing returns to step 500 to select another buffer. A buffer for which the segment is on the same storage unit as the previously selected segment probably should not be selected. If the storage unit otherwise accepts the request, the data ultimately is received in step 518.

The process from the point of view of the storage unit will now be described in connection with FIG. 21. The storage unit receives a request from a client in step 520 indicating waiting time E3. If the data is not yet available in the buffers at that storage unit, as determined in step 522, the storage unit rejects the request in step 524 and computes a revised estimated time which is sent to the client. If the data is otherwise available and the network connection of the storage unit is not busy, as determined in step 526, then the client becomes an Aactive client≅ and the communication channel is granted by the storage unit in step 528, allowing data to be transferred. If the network connection of the storage unit is busy transferring data to another client, the storage unit maintains a request from a Awaiting client,≅ to which data is transferred after the data transfer for the Aactive client≅ is completed. In order to determine whether the current client should be the Awaiting client,≅ the storage unit estimates a time by which the transfer could occur, in step 530, based on the number of requests with earlier deadlines in the network queue multiplied by the network transmission time for each request. If the computed estimated time of availability is greater than the waiting time E3, indicating the client is not willing to wait that long, as determined in step 532, the request is rejected in step 524. Also, if the specified priority of this request is lower than the priority for any current waiting client, as determined in step 534, the request is rejected in step 524. Otherwise, the request from any current waiting client is rejected in step 536 and this new client is designated as the current waiting client. When a transfer to the active client is completed, the waiting client becomes the active client and the data is transferred.

Figure 22:
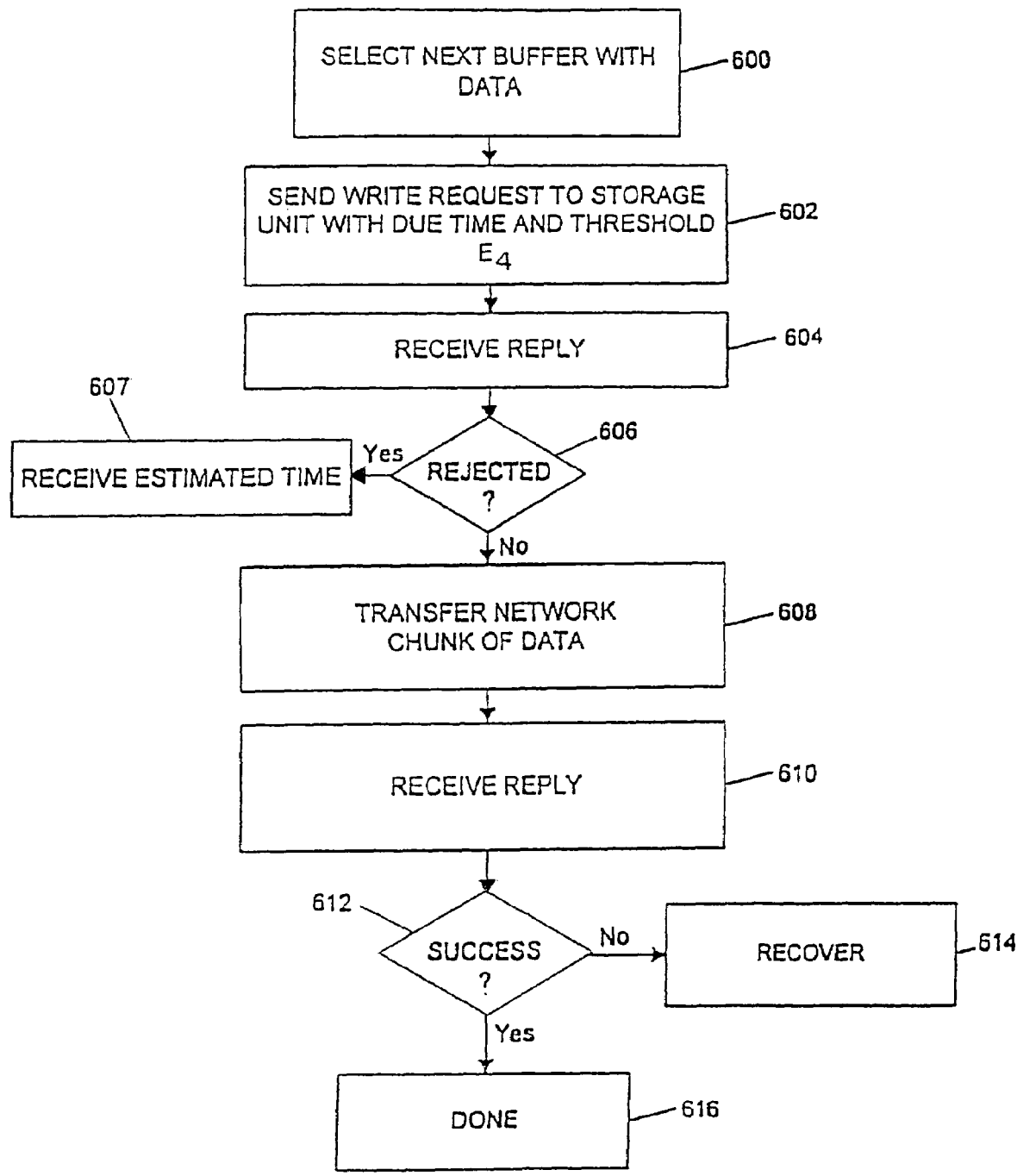
FIG. 22 is a flow chart describing an embodiment of a network scheduling process performed by a client for transferring data from the client to a storage unit.
Figure 23:
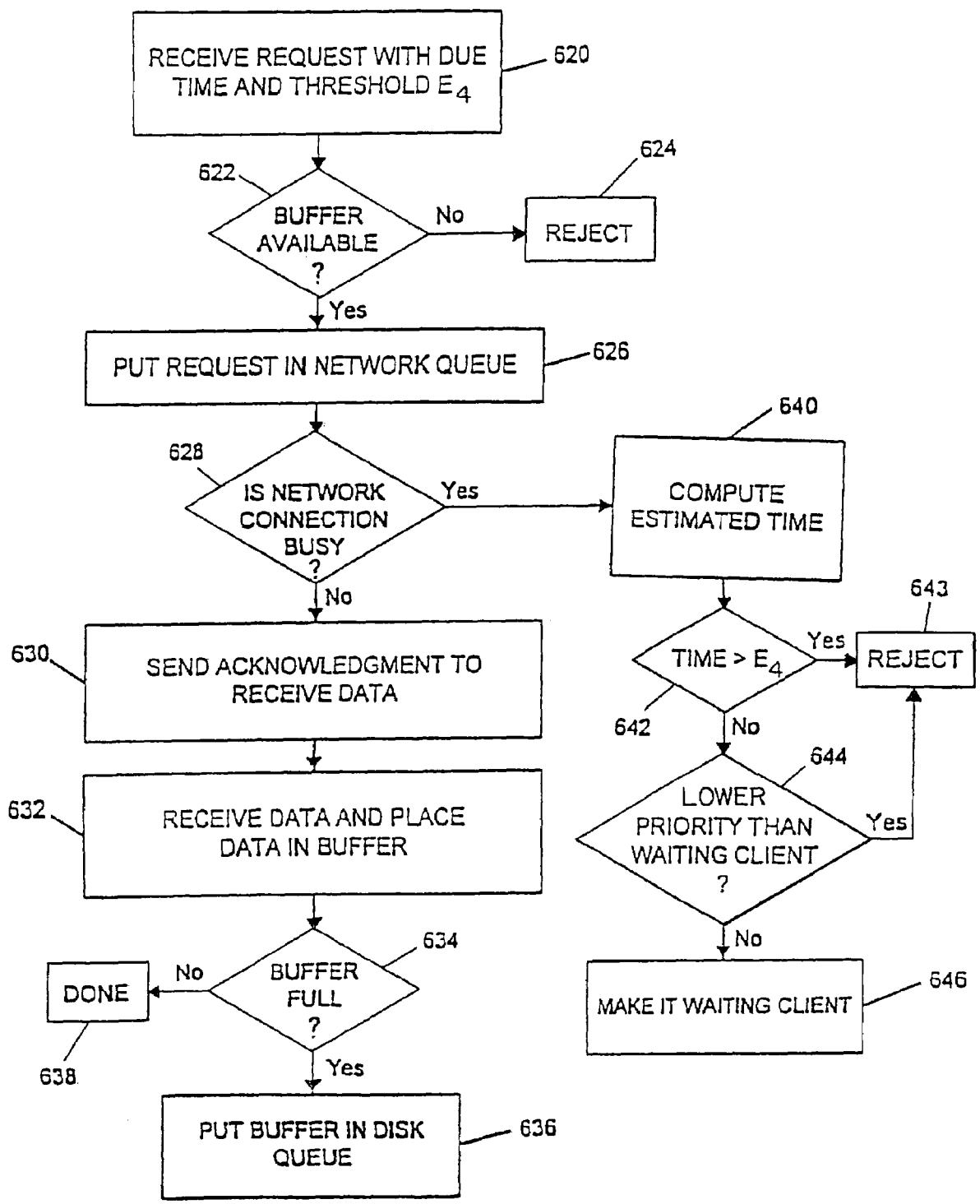
FIG. 23 is a flow chart describing an embodiment of a network scheduling process performed by a storage unit for transferring data from a client to the storage unit.

In order to transfer data from a client to a storage unit, a similar process may be used for scheduling the network transfer and for transferring the data from a buffer in the storage unit to nonvolatile storage. From the point of view of the client, this process will now be described in connection with FIG. 22. This process may be used to implement step 124 and 126 in FIG. 3.

Unlike the process of reading in which the client may place data into an arbitrary point within its set of buffers, the data to be transferred to a storage unit typically comes from a read pointer from a set of buffers used by the capture system. The capture system typically produces one or more streams of video information as well as one or more streams of audio information. Accordingly, the capture system may select one of the data streams according to the amount of free buffer space in the stream to receive captured data. This buffer at the current read pointer of the selected stream is selected in step 600. A write request is then sent to the storage unit in step 602. The request includes an identifier for the segment, a due time or other priority value, and a threshold E4 indicating an amount of time the client is willing to wait. The due time is used by the storage unit to prioritize network transfer requests. The threshold E4 is used by the client, similar to threshold E3 discussed above, to permit the client to efficiently schedule its own operations. The client, after sending the request to the storage unit, eventually receives a reply in step 604. If the reply indicates that the write request was rejected, as determined in step 606, the reply will include an estimated time by which the storage unit will be available to receive the data. This estimated time may be used by the client to schedule other operations. If the storage unit accepts the request to write the data, the client then sends, in step 608, a portion of the segment of the data to the storage unit. A reply may be received in step 610 indicating whether or not the write request was successful, as analyzed in step 612. A failure may involve recovery processes in step 614. Otherwise the process is complete as indicated in step 616.

From the point of view of the storage unit, the storage unit receives the write request from the client in step 620. The request will indicate a due time or other priority stamp which is used to place the request within the network queue. The storage unit then determines in step 622 if a buffer is available for receiving the data. The storage unit may make such a buffer available. In the unlikely event that no buffers are available, the request may be rejected in step 624. Otherwise, a request is put in the network queue in step 626 indicating the buffer allocated to receive the data, its priority stamp, and other information about the transfer. Next, the storage unit determines if the network connection is busy in step 628. If the network connection is not busy, the storage unit accepts the request in step 630 and sends a message to this effect to the client. The client then transfers the data which is received by the storage unit in step 632 and placed in the designated buffer. If the designated buffer is now full, as determined in step 634, the buffer is placed in the disk queue with an appropriate priority stamp in step 636. The storage unit=s processing of its disk queue will eventually cause the data to be transferred from the buffer to permanent storage. Otherwise, the storage unit waits until the client sends enough data to fill the buffer as indicated in step 638.

If the network connection of the storage unit is busy, as determined in step 628, the storage unit computes, in step 640, an estimated time by which the network connection of the storage unit should be available. If this computed time is greater than the indicated waiting time E4, as determined in step 642, the request is rejected in step 624 with an estimate of the time of availability of the storage unit. If the storage unit expects to be able to transfer the data within the waiting time E4 indicated by a client, the storage unit compares the priority of the request with the priority of a request for any currently waiting client, in step 644. If this request is of a lower priority than the request of the currently waiting client, the request is rejected. Otherwise, the request from the currently waiting client is rejected, and this new request is made the next request to be processed in step 646.

By scheduling data transfers over the network and by distributing the load on the storage units with selected access to randomly distributed copies of segments of data, this system is capable of efficiently transferring multiple streams of data in both directions between multiple applications and multiple storage units in a highly scalable and reliable manner, which is particularly beneficial for distributed multimedia production.

One application that may be implemented using such a computer network is the capability to send and return multiple streams to other external digital effects systems that are commonly used in live production. These systems may be complex and costly. Most disk-based nonlinear video editing systems have disk subsystems and bus architectures which cannot sustain multiple playback streams while simultaneously recording an effects return stream, which limits their abilities to be used in an online environment. Using this system, several streams may be sent to an effects system, which outputs an effects data stream to be stored on the multiple storage units. The several streams could be multiple camera sources or layers for dual digital video effects.

It is also possible to have multiple storage units providing data to one client to satisfy a client=s need for a high bandwidth stream of data that has a higher bandwidth than any one storage unit. For example, if each of twenty storage units had a 10 MB/s link to a switch and a client had a 200 MB/s link to the switch, the client could read 200 MB/s from twenty storage units simultaneously, permitting transfer of a data stream for high definition television (HDTV), for example.

Using the procedures outlined above, storage units and clients operate using local information and without central configuration management or control. A storage unit may be added to the system during operation without requiring the system to be shut down. The storage unit simply starts operation, informs clients of its availability, and then establishes processes to respond to access requests. This expandability complements the capability and reliability of the system.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. In a distributed data storage system comprising a plurality of independent storage units for storing the data and interconnected by a computer network, wherein data is stored on the plurality of storage units in files, wherein each file includes segments of data, wherein each segment has an identifier, and wherein two or more copies of each segment are distributed among the plurality of storage units, such that each segment is stored on at least two of the storage units, and wherein the segments of data are distributed nonsequentially among the plurality of storage units, a method for allowing one or more client systems to access data from the files, comprising:

within each client system:
accessing data that associates, for each segment of a file, the identifier of the segment with an indication of each of the storage units on which a copy of the segment is stored, to select a storage unit for each segment to be read from the file;
for each segment to be read from the file, sending a request for the segment to the selected storage unit, wherein the request includes the identifier of the requested segment of the file;

within each storage unit:
maintaining data defining information that associates, for each segment stored on the storage unit, the identifier of the segment with the location of the segment in the storage;
receiving a request over the computer network from one of the client systems for a segment of a file, wherein the received request includes the identifier of the requested segment of the file;
determining the location of the segment in the storage using the information that associates the identifier of the requested segment with the location of the segment in the storage;
retrieving the requested segment from the storage;
sending the retrieved segment over the computer network to the client system that requested the segment.

2. The method of claim 1, wherein the data for a file is stored in a segment table.

3. The method of claim 2, wherein the segment tables for a plurality of files is stored in a catalog.

4. The method of claim 3, wherein the catalog is stored in a central database accessible by all clients.

5. The method of claim 3, wherein the catalog is stored in each client.

6. The method of claim 3, wherein the catalog is distributed among the clients.

7. The method of claim 3, wherein the catalog is distributed among multiple databases accessible by the clients.

8. The method of claim 3, wherein the catalog is stored as a file on the plurality of storage units.

9. The method of claim 1, wherein the data that associates an identifier of a segment with an indication of each of the storage units on which a copy of the segment is stored is a function.

10. The method of claim 1, wherein the data comprises temporally continuous media data.

11. The method of claim 10, wherein the temporally continuous media data includes video data.

12. The method of claim 10, wherein the temporally continuous media data includes audio data.

13. The method of claim 1, wherein applications may request data from the plurality of storage units independently of each other or any centralized control.

14. The method of claim 1, wherein the storage unit is a server.

15. The method of claim 1, wherein the storage unit is an independently controlled disk storage unit.

16. A distributed data storage system for allowing one or more client systems to access data over a computer network, comprising:

a plurality of independent storage units for storing the data and interconnected by the computer network;
wherein the data is stored on the plurality of storage units in files, wherein each file includes segments of data, wherein each segment has an identifier, and wherein two or more copies of each segment are distributed among the plurality of storage units, such that each segment is stored on at least two of the storage units, and wherein the segments of data are distributed nonsequentially among the plurality of storage units;
computer readable storage including data that associates, for each segment of a file, the identifier of the segment with an indication of each of the storage units on which a copy of the segment is stored;

wherein each client system comprises:
- a network interface connected to the computer network for receiving and sending data over the computer network; and
- a processor connected to the network interface;
- wherein the processor accesses the data that associates, for each segment of a file, the identifier of the segment with an indication of each of the storage units on which a copy of the segment is stored, to select a storage unit for each segment to be read from the file;
- wherein the processor instructs the network interface to send a request, for each segment to be read from the file, to the selected storage unit for the segment, wherein the request includes the identifier of the requested segment of the file; and wherein each storage unit comprises:
- storage for storing the data;
- a memory containing data defining information that associates, for each segment stored on the storage unit, the identifier of the segment with the location of the segment in the storage;
- a network interface connected to the computer network for receiving and sending data over the computer network; and
- a processor connected to the network interface, the memory and the storage;
- wherein the processor, in response to a request received over the computer network from one of the client systems for a segment of a file, determines the location of the segment in the storage using the information that associates the identifier of the segment with the location of the segment in the storage, and retrieves the requested segment from the storage;
- wherein the processor instructs the network interface to send the retrieved segment to the client system.

17. The distributed data storage system of claim 16, wherein the data for a file is stored in a segment table.

18. The distributed data storage system of claim 17, wherein the segment tables for a plurality of files is stored in a catalog.

19. The distributed data storage system of claim 18, wherein the catalog is stored in a central database accessible by all clients.

20. The distributed data storage system of claim 18, wherein the catalog is stored in each client.

21. The distributed data storage system of claim 18, wherein the catalog is distributed among the clients.

22. The distributed data storage system of claim 18, wherein the catalog is distributed among multiple databases accessible by the clients.

23. The distributed data storage system of claim 18, wherein the catalog is stored as a file on the plurality of storage units.

24. The distributed data storage system of claim 16, wherein the data that associates an identifier of a segment with an indication of each of the storage units on which a copy of the segment is stored is a function.

25. The distributed data storage system of claim 16, wherein the data comprises temporally continuous media data.

26. The distributed data storage system of claim 25, wherein the temporally continuous media data includes video data.

27. The distributed data storage system of claim 25, wherein the temporally continuous media data includes audio data.

28. The distributed data storage system of claim 16, wherein applications may request data from the plurality of storage units independently of each other or any centralized control.

29. The distributed data storage system of claim 16, wherein the storage unit is a server.

30. The distributed data storage system of claim 16, wherein the storage unit is an independently controlled disk storage unit.

31. A distributed data storage system for allowing one or more client systems to access data over a computer network, comprising:
- a plurality of independent storage units for storing the data and interconnected by the computer network;
- wherein the data is stored on the plurality of storage units in files, wherein each file includes segments of data, wherein each segment has an identifier, and wherein each segment and redundancy information for each segment are distributed among the plurality of storage units;

wherein each storage unit comprises:
- storage for storing the data;
- a memory containing data defining information that associates, for each segment stored on the storage unit, the identifier of the segment with the location of the segment in the storage;
- a network interface connected to the computer network for receiving and sending data over the computer network; and
- a processor connected to the network interface, the memory and the storage;
- wherein the processor, in response to a request received over the computer network from one of the client systems for a segment of a file, determines the location of the segment in the storage using the information that associates the identifier of the segment with the location of the segment in the storage, and retrieves the requested segment from the storage;
- wherein the received request includes the identifier of the requested segment of the file; and
- wherein the processor instructs the network interface to send the retrieved segment to the client system.

32. The distributed data storage system of claim 31, wherein the redundancy information for a segment is a copy of the segment, and wherein each segment is stored on at least two of the storage units.

33. The distributed data storage system of claim 32, wherein the segments of data are distributed nonsequentially among the plurality of storage units.

34. The distributed data storage system of claim 33, further comprising computer readable storage including data that associates, for each segment of a file, the identifier of the segment with an indication of each of the storage units on which a copy of the segment is stored.

35. The distributed data storage system of claim 32, further comprising computer readable storage including data that associates, for each segment of a file, the identifier of the segment with an indication of each of the storage units on which a copy of the segment is stored.

36. The distributed data storage system of claim 31, wherein the segments of data are distributed nonsequentially among the plurality of storage units.

37. The distributed data storage system of claim 36, further comprising computer readable storage including data that associates, for each segment of a file, the identifier of the segment with an indication of each of the storage units on which a copy of the segment is stored.

38. The distributed data storage system of claim 31, further comprising computer readable storage including data that associates, for each segment of a file, the identifier of the segment with an indication of each of the storage units on which a copy of the segment is stored.

39. In a distributed data storage system comprising a plurality of independent storage units for storing the data and interconnected by a computer network, wherein data is stored on the plurality of storage units in files, wherein each file includes segments of data, wherein each segment has an identifier, and wherein each segment and redundancy information for each segment is distributed among the plurality of storage units, a method for processing requests from one or more client systems to access data from the files, comprising:

within each storage unit:

maintaining data defining information that associates, for each segment stored on the storage unit, the identifier of the segment with the location of the segment in the storage;

receiving a request over the computer network from one of the client systems for a segment of a file, wherein the received request includes the identifier of the requested segment of the file;

determining the location of the segment in the storage using the information that associates the identifier of the requested segment with the location of the segment in the storage;

retrieving the requested segment from the storage;

sending the retrieved segment over the computer network to the client system that requested the segment.

\* \* \* \* \*